(12) United States Patent
Kikuchi et al.

(10) Patent No.: US 9,081,640 B2
(45) Date of Patent: Jul. 14, 2015

(54) APPARATUS, METHOD AND MEDIUM FOR CALCULATING AN UPDATE ORDER ON A SERVICE LEVEL OBJECTIVE

(75) Inventors: Shinji Kikuchi, Kawasaki (JP); Yasuhide Matsumoto, Kawasaki (JP); Yuji Wada, Kawasaki (JP); Atsuji Sekiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 788 days.

(21) Appl. No.: 13/329,750

(22) Filed: Dec. 19, 2011

(65) Prior Publication Data

US 2012/0210311 A1    Aug. 16, 2012

(30) Foreign Application Priority Data

Feb. 14, 2011 (JP) ................................. 2011-029211

(51) Int. Cl.
| | |
|---|---|
| G06F 9/44 | (2006.01) |
| G06F 9/445 | (2006.01) |
| G06F 9/46 | (2006.01) |
| G06F 9/50 | (2006.01) |
| H04L 12/24 | (2006.01) |
| G06F 11/14 | (2006.01) |

(52) U.S. Cl.
CPC .. *G06F 8/65* (2013.01); *G06F 8/61* (2013.01); *G06F 9/5038* (2013.01); *G06F 11/1433* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 7,155,462 B1 | 12/2006 | Singh et al. | |
| 7,500,234 B2 | 3/2009 | Hatasaki | |
| 7,584,467 B2 * | 9/2009 | Wickham et al. | 717/171 |
| 7,735,086 B2 * | 6/2010 | Hellerstein et al. | 718/105 |
| 8,341,617 B2 * | 12/2012 | Bunn | 717/168 |
| 8,839,221 B2 * | 9/2014 | Sapuntzakis et al. | 717/168 |

(Continued)

FOREIGN PATENT DOCUMENTS

| | | |
|---|---|---|
| JP | 2004-259110 | 9/2004 |
| JP | 2005-107803 | 4/2005 |

(Continued)

OTHER PUBLICATIONS

Reboucas, R., et al., "A Decision Support Tool to Optimize Scheduling of IT Changes," 10th IFIP/IEEE Symposium on Integrated Network Management [online], 2007 [retrieved Sep. 16, 2014], Retrieved from Internet: <URL: http://ieeexplore.ieee.org/xpls/abs_all.jsp?arnumber=4258551>, pp. 343-352.*

(Continued)

*Primary Examiner* — Don Wong
*Assistant Examiner* — Todd Aguilera
(74) *Attorney, Agent, or Firm* — Fujitsu Patent Center

(57) ABSTRACT

An update apparatus used in a system that provides service using software and performing update of the software, including a processing apparatus configured to calculate a difference between a possible down time of the service according to a service level and a down time of the service indicated by operation performance stored in storage unit, and when there are a plurality of pieces of software as update targets, to calculate an update order of the plurality of pieces of update target software according to a degree of influence to the difference by service down when update of software fails, and to perform update of the plurality of pieces of update target software according to the update order.

9 Claims, 30 Drawing Sheets

| UPDATE TARGET ID | App7 | VM1 | VM3 | VM5 | VMM1 | VMM2 | VMM4 |
|---|---|---|---|---|---|---|---|
| DEPENDENT COMPONENT ID | - | App1 | App3 | App5 | VM1, VM2, VM3 | VM4, VM5, VM6 | - |
| USER | User 2 | User 1 | User 3 | User 1 | User 1, 2, 3 | User 1, 3 | - |
| MARGIN VALUE | 23.2 MINUTES | 56 MINUTES | 82 MINUTES | 56 MINUTES | 23.2 MINUTES (MINIMUM VALUE AMONG MARGIN VALUES OF USER 1, 2, 3) | 56 MINUTES (MINIMUM VALUE AMONG MARGIN VALUES OF USER 1, 3) | - |
| UPDATE & RECOVERY TIME | 25 MINUTES | 70 MINUTES | 70 MINUTES | 70 MINUTES | 40 MINUTES | 40 MINUTES | 40 MINUTES |
| DIFFERENCE | -1.8 MINUTES | -14 MINUTES | 12 MINUTES | -14 MINUTES | -16.8 MINUTES | 16 MINUTES | - |
| ADDED PENALTY($) | 3 | 4.6 | 0 | 4.6 | 28 | 0 | 0 |
| ORDER | 4 | 5 | 3 | 5 | 6 | 2 | 1 |

518-1

(56) References Cited

U.S. PATENT DOCUMENTS

| | | |
|---|---|---|
| 2006/0130042 A1 | 6/2006 | Dias et al. |
| 2008/0201702 A1* | 8/2008 | Bunn .......................... 717/171 |
| 2009/0100420 A1* | 4/2009 | Sapuntzakis et al. ......... 717/171 |
| 2009/0265702 A1 | 10/2009 | Lu et al. |
| 2011/0265072 A1* | 10/2011 | Matthew ...................... 717/169 |
| 2014/0245279 A1* | 8/2014 | Ohtake et al. ................. 717/170 |
| 2014/0380314 A1* | 12/2014 | Shimada et al. ................. 718/1 |

FOREIGN PATENT DOCUMENTS

| | | |
|---|---|---|
| JP | 2010-117980 | 5/2010 |
| JP | 2010-128581 | 6/2010 |
| JP | 2010-195111 | 9/2010 |

OTHER PUBLICATIONS

Setzer, T., et al. "Change Scheduling Based on Business Impact Analysis of Change-Related Risk," IEEE Transactions on Network Service Management, vol. 7, No. 1 [online], 2010, Retrieved from Internet: <URL: http://ieeexplore.ieee.org/xpls/abs_all.jsp?arnumber=5412873&tag=1>, pp. 58-71.*

"Intellectual Property Office Search Report" mailed by IPO and corresponding to application No. GB1122234.6 on Apr. 13, 2012.

* cited by examiner

| USER | SLO | | PENALTY UNIT PRICE | PENALTY MAXIMUM VALUE |
|---|---|---|---|---|
| User 1 | 99.5% | (POSSIBLE DOWN TIME/MONTH : 216MINUTES) | $ 20 / hour | $ 500 / month |
| User 2 | 99.9% | (POSSIBLE DOWN TIME/MONTH : 43.2MINUTES) | $ 100 / hour | $ 1000 / month |
| User 3 | 99.0% | (POSSIBLE DOWN TIME/MONTH : 432MINUTES) | $ 10 / hour | $ 200 / month |

511

F I G. 4

512

| ID | Name | Type | VERSION | DEPENDENCY | USER |
|---|---|---|---|---|---|
| PM1 | Primergy | PC | – | – | – |
| PM2 | Primergy | PC | – | – | – |
| PM3 | Primergy | PC | – | – | – |
| PM4 | Primergy | PC | – | – | – |
| VMM1 | Xen Svr | VMM | 2.0.0 | PM1 | – |
| VMM2 | Xen Svr | VMM | 2.0.0 | PM2 | – |
| VMM3 | Xen Svr | VMM | 2.0.2 | PM3 | – |
| VMM4 | Xen Svr | VMM | 2.0.0 | PM4 | – |
| VM1 | Ubuntu | OS | 9.04 | VMM1 | User 1 |
| VM2 | Win Svr | OS | SP2 | VMM1 | User 2 |
| VM3 | Ubuntu | OS | 9.04 | VMM1 | User 3 |
| VM4 | Ubuntu | OS | 9.10 | VMM2 | User 1 |
| VM5 | Ubuntu | OS | 9.04 | VMM2 | User 1 |
| VM6 | Ubuntu | OS | 9.10 | VMM2 | User 3 |
| VM7 | Win Svr | OS | SP2 | VMM3 | User 2 |
| VM8 | Ubuntu | OS | 9.10 | VMM3 | User 3 |
| VM9 | Win Svr | OS | SP2 | VMM3 | User 2 |
| VM10 | Ubuntu | OS | 9.10 | VMM3 | User 3 |
| App1 | Apache | Web | 2.2 | VM1 | User 1 |
| App2 | IIS | Web | 6.0 | VM2 | User 2 |
| App3 | Apache | Web | 2.2 | VM3 | User 3 |
| App4 | Apache | Web | 2.2 | VM4 | User 1 |
| App5 | MySQL | DB | 4.0 | VM5 | User 1 |
| App6 | Apache | Web | 2.2 | VM6 | User 3 |
| App7 | Interstage | App | 7.0 | VM7 | User 2 |
| App8 | Tomcat | App | 6.0 | VM8 | User 3 |
| App9 | MySQL | DB | 4.0 | VM9 | User 2 |
| App10 | MySQL | DB | 4.0 | VM10 | User 3 |

FIG. 6

| Name | Type | APPLIED PATCH/ EXECUTED COMMAND | REQUIRED UPDATE TIME | REQUIRED RECOVERY TIME | VERSION | Updated version |
|---|---|---|---|---|---|---|
| Xen Svr | VMM | P-2.0.2-update.patch | 30 MINUTES | 10 MINUTES | 2.0.0 OR OLDER | 2.0.2 |
| Ubuntu | OS | update-notifier-kde -u | 40 MINUTES | 30 MINUTES | 9.04 | 9.10 |
| Interstage | App | Upgrade_8.0.exe | 15 MINUTES | 10 MINUTES | 7.0 OR OLDER | 8.0 |

| ID | Name | Type | VERSION | APPLIED PATCH/EXECUTED COMMAND | DEPENDENT COMPONENT |
|---|---|---|---|---|---|
| VM3 | Ubuntu | VM | 9.04 | update-notifier-kde -u | Xen Svr 2.0.0, Apache 2.2 |

515

| USER | SLO | POSSIBLE DOWN TIME/MONTH | MONTHLY DOWN TIME | MARGIN VALUE |
|---|---|---|---|---|
| User 1 | 99.5% | 216 MINUTES | 160 MINUTES | 56 MINUTES |
| User 2 | 99.9% | 43.2 MINUTES | 20 MINUTES | 23.2 MINUTES |
| User 3 | 99.0% | 432 MINUTES | 350 MINUTES | 82 MINUTES |

| Name | Type | APPLIED PATCH/EXECUTED COMMAND | VERSION | UPDATE TARGET ID |
|---|---|---|---|---|
| Xen Svr | VMM | P-2.0.2-update.patch | 2.0.0 OR OLDER | VMM1, VMM2, VMM4 |
| Ubuntu | OS | update-notifier-kde -u | 9.04 | VM1, VM3, VM5 |
| Interstage | App | Upgrade_8.0.exe | 7.0 OR OLDER | App7 |

517

| UPDATE TARGET ID | App7 | VM1 | VM3 | VM5 | VMM1 | VMM2 | VMM4 |
|---|---|---|---|---|---|---|---|
| DEPENDENT COMPONENT ID | — | App1 | App3 | App5 | VM1, VM2, VM3 | VM4, VM5, VM6 | — |
| USER | User 2 | User 1 | User 3 | User 1 | User 1, 2, 3 | User 1, 3 | — |
| MARGIN VALUE | 23.2 MINUTES | 56 MINUTES | 82 MINUTES | 56 MINUTES | 23.2 MINUTES (MINIMUM VALUE AMONG MARGIN VALUES OF USER 1, 2, 3) | 56 MINUTES (MINIMUM VALUE AMONG MARGIN VALUES OF USER 1, 3) | — |
| UPDATE & RECOVERY TIME | 25 MINUTES | 70 MINUTES | 70 MINUTES | 70 MINUTES | 40 MINUTES | 40 MINUTES | 40 MINUTES |
| DIFFERENCE | −1.8 MINUTES | −14 MINUTES | 12 MINUTES | −14 MINUTES | −16.8 MINUTES | 16 MINUTES | — |
| ADDED PENALTY ($) | 3 | 4.6 | 0 | 4.6 | 28 | 0 | 0 |
| ORDER | 4 | 5 | 3 | 5 | 6 | 2 | 1 |

FIG. 12

| ID | Name | Type | VERSION | DEPENDENCY | USER |
|---|---|---|---|---|---|
| VMM4 | Xen Svr | VMM | (2.0.0 →) 2.0.2 | PM4 | – |

F I G. 1 4

| UPDATE TARGET ID | App7 | VM1 | VM3 | VM5 | VMM1 | VMM2 | VMM4 |
|---|---|---|---|---|---|---|---|
| DEPENDENT COMPONENT ID | - | App1 | App3 | App5 | VM1, VM2, VM3 | VM4, VM5, VM6 | - |
| USER | User 2 | User 1 | User 3 | User 1 | User 1, 2, 3 | User 1, 3 | - |
| MARGIN VALUE | 23.2 MINUTES | 56 MINUTES | 82 MINUTES | 56 MINUTES | 23.2 MINUTES | 56 MINUTES | - |
| UPDATE& RECOVERY TIME | 25 MINUTES | 70 MINUTES | 70 MINUTES | 70 MINUTES | 40 MINUTES | 40 MINUTES | - |
| DIFFERENCE | -1.8 MINUTES | -14 MINUTES | 12 MINUTES | -14 MINUTES | -16.8 MINUTES | 16 MINUTES | - |
| ADDED PENALTY($) | 3 | 4.6 | 0 | 4.6 | 28 | 0 | 0 |
| ORDER | 3 | 4 | 2 | 4 | 5 | 1 | (COMPLETED) |

FIG. 15

| ID | Name | Type | VERSION | DEPENDENCY | USER |
|---|---|---|---|---|---|
| VM4 | Ubuntu | OS | 9.1 | (VMM2 → ) VMM4 | User 1 |
| VM5 | Ubuntu | OS | 9.04 | (VMM2 → ) VMM4 | User 1 |
| VM6 | Ubuntu | OS | 9.1 | (VMM2 → ) VMM4 | User 3 |
| VMM2 | Xen Svr | VMM | (2.0.0 → ) 2.0.2 | PM2 | - |

| UPDATE TARGET ID | App7 | VM1 | VM3 | VM5 | VMM1 | VMM2 | VMM4 |
|---|---|---|---|---|---|---|---|
| DEPENDENT COMPONENT ID | — | — | — | — | VM1, VM2, VM3 | — | VM4, VM5, VM6 |
| USER | User 2 | User 1 | User 3 | User 1 | User 1, 2, 3 | — | User 1, 3 |
| MARGIN VALUE | 23.2 MINUTES | 56 MINUTES | 82 MINUTES | 56 MINUTES | 23.2 MINUTES | — | — |
| UPDATE & RECOVERY TIME | 25 MINUTES | 70 MINUTES | 70 MINUTES | 70 MINUTES | 40 MINUTES | — | — |
| DIFFERENCE | −1.8 MINUTES | −14 MINUTES | 12 MINUTES | −14 MINUTES | −16.8 MINUTES | — | — |
| ADDED PENALTY ($) | 3 | 4.6 | 0 | 4.6 | 28 | 0 | 0 |
| ORDER | 2 | 3 | 1 | 3 | 4 | (COMPLETED) | (COMPLETED) |

518-3

F I G. 1 7

| | | | | | | | |
|---|---|---|---|---|---|---|---|
| UPDATE TARGET ID | App7 | VM1 | VM3 | VM5 | VMM1 | VMM2 | VMM4 |
| DEPENDENT COMPONENT ID | – | App1 | App3 | App5 | VM1, VM2, VM3 | – | VM4, VM5, VM6 |
| USER | User 2 | User 1 | User 3 | User 1 | User 1, 2, 3 | – | User 1, 3 |
| MARGIN VALUE | 23.2 MINUTES | 56 MINUTES | 12 MINUTES | 56 MINUTES | 12 MINUTES | – | – |
| UPDATE & RECOVERY TIME | 25 MINUTES | 70 MINUTES | 70 MINUTES | 70 MINUTES | 40 MINUTES | – | – |
| DIFFERENCE | -1.8 MINUTES | -14 MINUTES | -56 MINUTES | -14 MINUTES | -28 MINUTES | – | – |
| ADDED PENALTY ($) | 3 | 4.6 | 9.6 | 4.6 | 4.6 | 0 | 0 |
| ORDER | 1 | (TROUBLE) | (TROUBLE) | 2 | 3 | (COMPLETED) | (COMPLETED) |

| ID | Name | Type | VERSION | DEPENDENCY | USER |
|---|---|---|---|---|---|
| App7 | Interstage | App | (7.0 → ) 8.0 | VM7 | User 2 |

512-3

| | | | | | | | |
|---|---|---|---|---|---|---|---|
| UPDATE TARGET ID | App7 | VM1 | VM3 | VM5 | VMM1 | VMM2 | VMM4 |
| DEPENDENT COMPONENT ID | — | App1 | App3 | App5 | VM1, VM2, VM3 | — | VM4, VM5, VM6 |
| USER | User 2 | User 1 | User 3 | User 1 | User 1, 2, 3 | — | User 1, 3 |
| MARGIN VALUE | 23.2 MINUTES | 56 MINUTES | 12 MINUTES | 56 MINUTES | 12 MINUTES | — | — |
| UPDATE & RECOVERY TIME | — | 70 MINUTES | 70 MINUTES | 70 MINUTES | 40 MINUTES | — | — |
| DIFFERENCE | — | −14 MINUTES | −56 MINUTES | −14 MINUTES | −28 MINUTES | — | — |
| ADDED PENALTY ($) | — | 4.6 | 9.6 | 4.6 | 4.6 | 0 | 0 |
| ORDER | (COMPLETED) | (TROUBLE) | (TROUBLE) | 1 | 2 | (COMPLETED) | (COMPLETED) |

| ID | Name | Type | VERSION | DEPENDENCY | USER |
|---|---|---|---|---|---|
| VM5 | Ubuntu | OS | (9.04 →) 9.10 | VMM4 | User 1 |

512-4

| | | | | | | | |
|---|---|---|---|---|---|---|---|
| UPDATE TARGET ID | App7 | VM1 | VM3 | VM5 | VMM1 | VMM2 | VMM4 |
| DEPENDENT COMPONENT ID | - | App1 | App3 | App5 | VM1, VM2, VM3 | - | VM4, VM5, VM6 |
| USER | User 2 | User 1 | User 3 | User 1 | User 1, 2, 3 | - | User 1, 3 |
| MARGIN VALUE | 23.2 MINUTES | 56 MINUTES | 12 MINUTES | 56 MINUTES | 12 MINUTES | - | - |
| UPDATE & RECOVERY TIME | - | 70 MINUTES | 70 MINUTES | - | 40 MINUTES | - | - |
| DIFFERENCE | - | -14 MINUTES | -56 MINUTES | - | -28 MINUTES | - | - |
| ADDED PENALTY ($) | - | 4.6 | 9.6 | - | 4.6 | - | - |
| ORDER | (COMPLETED) | (TROUBLE) | (TROUBLE) | (COMPLETED) | 1 | (COMPLETED) | 0 (COMPLETED) |

FIG. 22

| ID | Name | Type | VERSION | DEPENDENCY | USER |
|---|---|---|---|---|---|
| VM1 | Ubuntu | OS | 9.04 | (VMM1 →) VMM2 | User 1 |
| VM2 | Win Svr | OS | SP2 | (VMM1 →) VMM2 | User 2 |
| VM3 | Ubuntu | OS | 9.04 | (VMM1 →) VMM2 | User 3 |
| VMM1 | Xen Svr | VMM | (2.0.0 →) 2.0.2 | PM1 | - |

| UPDATE TARGET ID | App7 | VM1 | VM3 | VM5 | VMM1 | VMM2 | VMM4 |
|---|---|---|---|---|---|---|---|
| DEPENDENT COMPONENT ID | — | App1 | App3 | App5 | — | VM1, VM2, VM3 | VM4, VM5, VM6 |
| USER | User 2 | User 1 | User 3 | User 1 | — | User 1, 2, 3 | User 1, 3 |
| MARGIN VALUE | 23.2 MINUTES | 56 MINUTES | 12 MINUTES | 56 MINUTES | — | — | — |
| UPDATE & RECOVERY TIME | — | 70 MINUTES | 70 MINUTES | — | — | — | — |
| DIFFERENCE | — | −14 MINUTES | −56 MINUTES | — | — | — | — |
| ADDED PENALTY ($) | — | 4.6 | 9.6 | — | — | — | — |
| ORDER | (COMPLETED) | 1 | 2 | (COMPLETED) | (COMPLETED) | 0 | 0 |
|  |  |  |  |  |  | (COMPLETED) | (COMPLETED) |

| ID | Name | Type | VERSION | DEPENDENCY | USER |
|---|---|---|---|---|---|
| VM1 | Ubuntu | OS | (9.04 →) 9.10 | VMM2 | User 1 |

512-6

| UPDATE TARGET ID | App7 | VM1 | VM3 | VM5 | VMM1 | VMM2 | VMM4 |
|---|---|---|---|---|---|---|---|
| DEPENDENT COMPONENT ID | — | App1 | App3 | App5 | — | VM1, VM2, VM3 | VM4, VM5, VM6 |
| USER | User 2 | User 1 | User 3 | User 1 | — | User 1, 2, 3 | User 1, 3 |
| MARGIN VALUE | 23.2 MINUTES | 56 MINUTES | 12 MINUTES | 56 MINUTES | — | — | — |
| UPDATE & RECOVERY TIME | — | — | 70 MINUTES | — | — | — | — |
| DIFFERENCE | — | — | −56 MINUTES | — | — | — | — |
| ADDED PENALTY ($) | — | — | 9.6 | — | — | 0 | 0 |
| ORDER | (COMPLETED) | (COMPLETED) | 1 | (COMPLETED) | (COMPLETED) | (COMPLETED) | (COMPLETED) |

| ID | Name | Type | VERSION | DEPENDENCY | USER |
|---|---|---|---|---|---|
| VM3 | Ubuntu | OS | (9.04 → ) 9.10 | VMM2 | User 3 |

512-7

| UPDATE TARGET ID | App7 | VM1 | VM3 | VM5 | VMM1 | VMM2 | VMM4 |
|---|---|---|---|---|---|---|---|
| DEPENDENT COMPONENT ID | - | App1 | App3 | App5 | - | VM1, VM2, VM3 | VM4, VM5, VM6 |
| USER | User 2 | User 1 | User 3 | User 1 | - | User 1, 2, 3 | User 1, 3 |
| MARGIN VALUE | 23.2 MINUTES | 56 MINUTES | 12 MINUTES | 56 MINUTES | - | - | - |
| UPDATE & RECOVERY TIME | - | - | - | - | - | - | - |
| DIFFERENCE | - | - | - | - | - | - | - |
| ADDED PENALTY ($) | - | - | - | - | - | 0 | 0 |
| ORDER | (COMPLETED) | (COMPLETED) | (COMPLETED) | (COMPLETED) | (COMPLETED) | (COMPLETED) | (COMPLETED) |

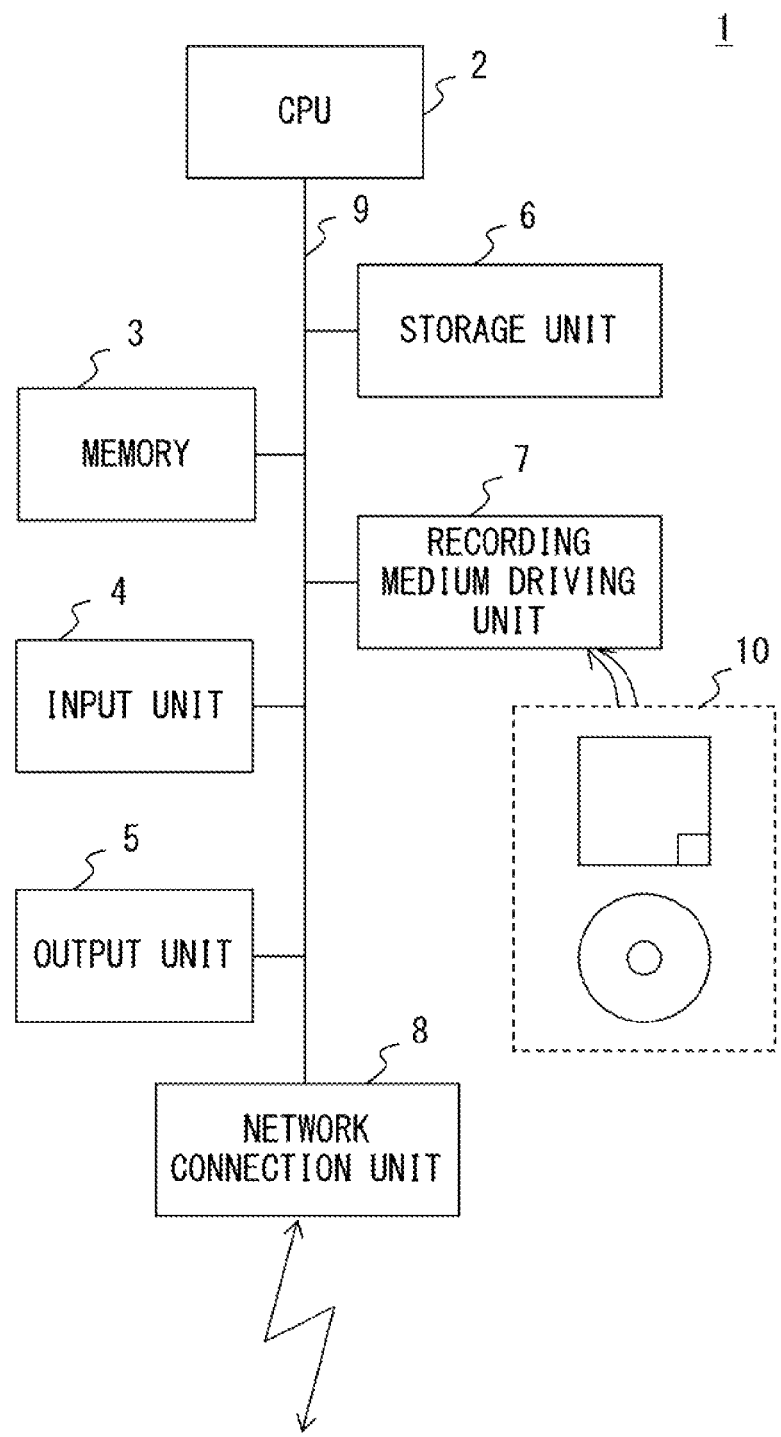
F I G. 3 0

APPARATUS, METHOD AND MEDIUM FOR CALCULATING AN UPDATE ORDER ON A SERVICE LEVEL OBJECTIVE

CROSS-REFERENCE TO RELATED APPLICATION

This application is based upon and claims the benefit of priority of the prior Japanese Patent Application No. 2011-29211, filed on Feb. 14, 2011, the entire contents of which are incorporated herein by reference.

FIELD

The embodiments discussed herein are related to an updating apparatus, an updating method and a recording medium.

BACKGROUND

Currently, a form of using computer resources (for example, the server, storage, application, and so on) via a network, so called cloud computing is practiced.

In cloud computing, the user is only required to prepare a minimum connection environment including a terminal such as a personal computer and the like and a browser that operates on the terminal and the like, alleviating troubles such as maintenance of the apparatus and data management.

The service provided in the form of cloud computing is called cloud service.

A provider of the cloud service presents the target value (Service Level Objective: SLO) of the availability of the system, and provides service in accordance with it.

The operation of the system to provide the cloud service involves updating works such as application of a security patch, upgrading and the like. Such updating works are carried out by the cloud service provider in cloud computing.

A system that provides the cloud service has components consisting of hardware components and software components. Hardware components are hardware such as the server and network device for example. Meanwhile, software components are software such as the Virtual Machine Monitor (VMM), Virtual Machine (VM), Operating System (OS), application and the like.

Some combinations of these components cause troubles, but information on combinations with which troubles occur are not readily provided by the vendor of each component.

Therefore, it is difficult to avoid combination of components with which troubles occur, and a trouble occurs sometimes when updating a component, causing failure to attain the SLO.

Meanwhile, as a method to avoid deterioration of availability, that is, the operation performance of a service, there is a method to prepare a testing environment, check presence/absence of a trouble by performing the updating in the testing environment, then to perform the updating in the actual environment. However, such a method has a problem that the cost is very high, since a complicated configuration that is similar to the actual environment is prepared to check the trouble.

When failure to attain the SLO occurs due to a trouble caused in updating a component, the provider of the cloud service has to pay a penalty, reducing its income. In addition, a cloud service that can only offer low availability causes user withdrawal.

Therefore, it is preferable that the availability does not fall below the target value.

[Patent Document 1] Japanese Laid-open Patent Publication No. 2004-259110

[Patent Document 2] Japanese Laid-open Patent Publication No. 2005-107803

[Patent Document 3] Japanese Laid-open Patent Publication No. 2010-128581

SUMMARY

According to an aspect of the invention, an update apparatus used in a system that provides service using software and performing update of the software, includes a processing apparatus configured to calculate a difference between a possible down time of the service according to a service level and a down time of the service indicated by operation performance stored in storage unit, and when there are a plurality of pieces of software as update targets, to calculate an update order of the plurality of pieces of update target software according to a degree of influence to the difference by service down when update of software fails, and to perform update of the plurality of pieces of update target software according to the update order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating service level information.

FIG. 6 is a diagram illustrating system configuration information,

FIG. 7 is a diagram illustrating update request information.

FIG. 9 is a diagram illustrating trouble case information.

FIG. 10 is a diagram illustrating margin value information.

FIG. 11 is a diagram illustrating an update target.

FIG. 12 is a diagram illustrating priority information.

FIG. 14 is a diagram illustrating an update position of the system configuration information.

FIG. 15 is a diagram illustrating priority information.

FIG. 16 is a diagram illustrating update positions of the system configuration information.

FIG. 17 is a diagram illustrating priority information.

FIG. 18 is a diagram illustrating priority information.

FIG. 19 is a diagram illustrating an update position of the system configuration information.

FIG. 20 is a diagram illustrating priority information.

FIG. 21 is a diagram illustrating an update position of the system configuration information.

FIG. 22 is a diagram illustrating priority information.

FIG. 23 is a diagram illustrating update positions of the system configuration information.

FIG. 24 is a diagram illustrating priority information.

FIG. 25 is a diagram illustrating an update position of the system configuration information.

FIG. 26 is a diagram illustrating priority information.

FIG. 27 is a diagram illustrating an update position of the system configuration information.

FIG. 28 is a diagram illustrating priority information.

FIG. 30 is a configuration diagram of an information processing apparatus (computer).

DESCRIPTION OF EMBODIMENTS

Hereinafter, an embodiment is described with reference to the drawings.

Figure 1:
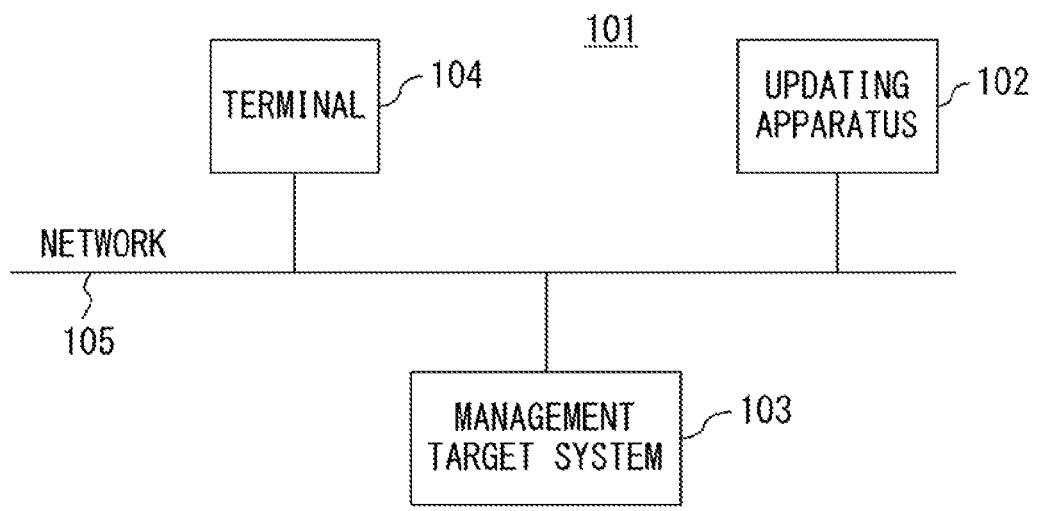
FIG. 1 is a configuration diagram of a system according to the embodiment.

FIG. 1 is a configuration diagram of a system according to the embodiment.

A system 101 has an updating apparatus 102, a management target system 103, and a terminal 104.

The updating apparatus 102, the management target device 103, and the terminal 104 are connected through a network 105.

The updating apparatus 102 collects configuration information and operation information of the management target system 103, and updates the components of the management target system 103 according to the instruction from the administrator.

The management target system 103 provides the terminal 104 with usage services such as a web server, database (DB) and the like. The management target system 103 is a server (information processing apparatus), a network device and the like.

The terminal 104 is used by a user and receives a service provided by the management target system 103.

Figure 2:
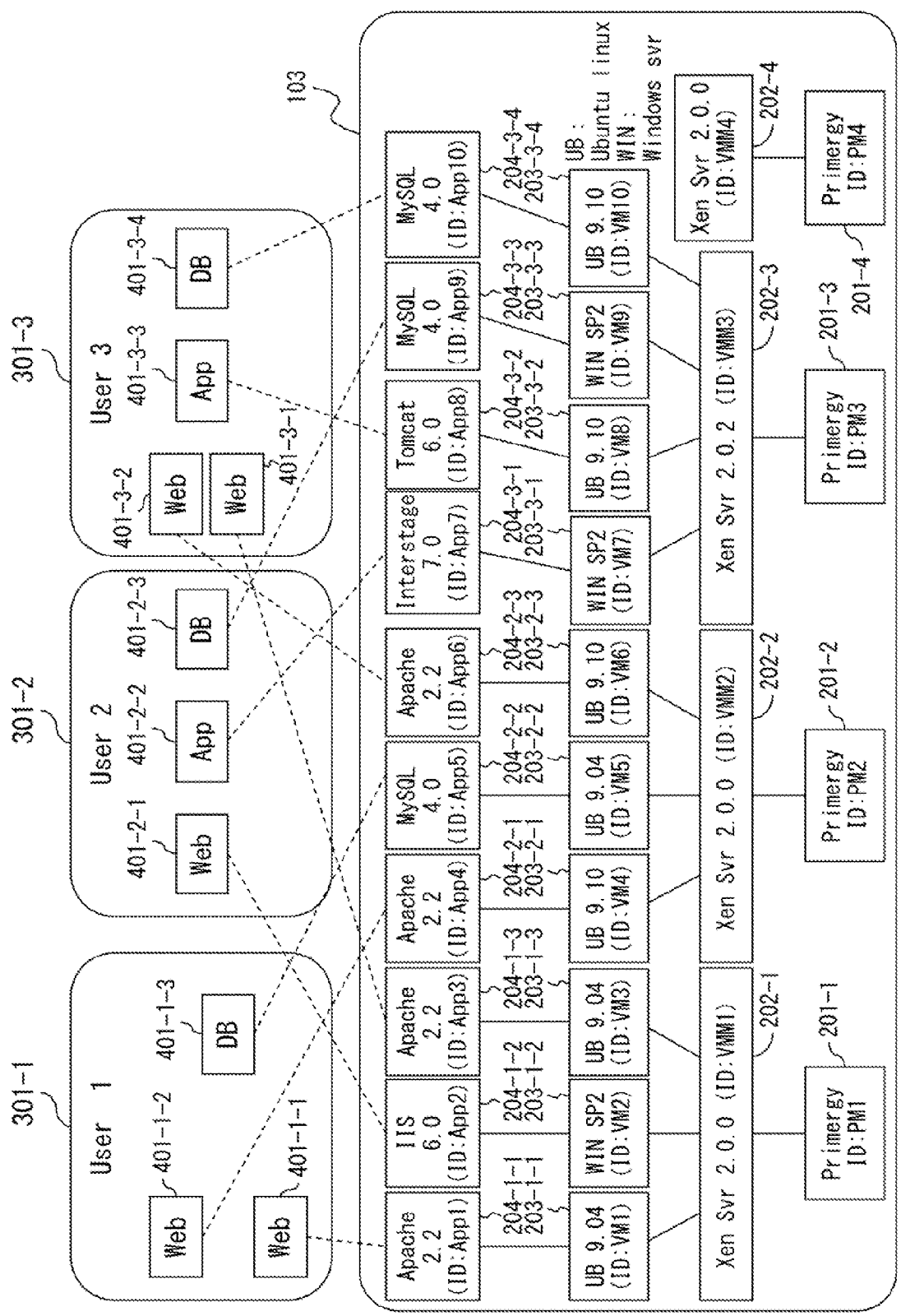
FIG. 2 is a diagram illustrating details of a management target system according to the embodiment.

FIG. 2 is a diagram illustrating details of the management target system according to the embodiment.

The upper part of FIG. 2 illustrates the service that a user is using, and the lower part of FIG. 2 illustrates detailed components of the management target system.

The management target system 103 has servers 201-*i* (i=1-4).

The servers 201-*i* are information processing apparatuses that are able to execute various processes. Meanwhile, the performance of the respective servers 201-*i* may be the same. In addition, as an example of the server, 201-*i*, for example, PRIMERGY may be used.

In addition, PM1-PM4 are respectively assigned as an identifier (ID) to the servers 201-*i*. Meanwhile, PM means physical machines.

Hereinafter, the configuration of each server 201 is described.

The server 201-1 has a Virtual Machine Monitor (VMM) 202-1.

The VMM 202-1 is software that creates a plurality of virtual machines and controls the OS on the virtual machine. As the VMM 202-1, for example, XEN Server (Svr) version 2.0.0 may be used. VMM1 is assigned to the VMM 202-1 as the ID.

The VMM 202-1 has three virtual machines, and each virtual machine has an OS 203-1.

As the OS 203-1-1, for example, UBUNTU LINUX (UBUNTU or UB) version 9.04 may be used. VM1 is assigned to the OS203-1-1 as the ID.

The OS 203-1-1 has an application 204-1-1. The application 204-1-1 is application software that operates on the OS 203-1-1. The application 204-1-1 is web server software, and for example, Apache version 2.2 may be used. App1 is assigned to the application 204-1-1 as the ID.

As the OS 203-1-2, for example, WINDOWS Server (WIN or WIN Svr) version SP2 may be used. For the OS 203-1-2, VM2 is assigned as the ID.

The OS 203-1-2 has an application 204-1-2. The application 204-1-2 is application software that operates on the OS 203-1-2. The application 204-1-2 is web server software, and for example, IIS version 6.0 may be used. App2 is assigned to the application 204-1-2 as the ID.

As the OS 203-1-3, for example, UBUNTU LINUX (UBUNTU or UB) version 9.04 may be used. VM3 is assigned to the OS 203-1-3 as the ID.

The OS 203-1-3 has an application 204-1-3. The application 204-1-3 is application software that operates on the OS 203-1-1. The application 204-1-3 is web server software, and for example, Apache version 2.2 may be used. App3 is assigned to the application 204-1-3 as the ID.

The server 201-2 has the VMM 202-2.

The VMM 202-2 is software that creates a plurality of virtual machines and controls the OS on the virtual machine. As the VMM 202-2, for example, XEN Server (Svr) version 2.0.0 may be used.

The VMM 202-2 has three virtual machines, and each virtual machined has an OS 203-2.

As the OS 203-2-1, for example, UBUNTU LINUX (UBUNTU or UB) version 9.10 may be used. VM4 is assigned to the OS203-2-1 as the ID.

The OS 203-2-1 has an application 204-2-1. The application 204-2-1 is application software that operates on the OS 203-2-1. The application 204-2-1 is web server software, and for example, Apache version 2.2 may be used. App4 is assigned to the application 204-2-1 as the ID.

As the OS 203-2-2, for example, UBUNTU LINUX (UBUNTU or UB) may be used. For the OS 203-2-2, VM5 is assigned as the ID.

The OS 203-2-2 has an application 204-2-2. The application 204-2-2 is application software that operates on the OS 203-2-2. The application 204-2-2 is database software, and for example, MySQL version 4.0 may be used. App5 is assigned to the application 204-2-2 as the ID.

As the OS 203-2-3, for example, UBUNTU LINUX (UBUNTU or UB) version 9.10 may be used. VM6 is assigned to the OS203-2-3 as the ID.

The OS 203-2-3 has an application 204-2-3. The application 204-2-3 is application software that operates on the OS 203-2-1. The application 204-2-3 is web server software, and for example, Apache version 2.2 may be used. App6 is assigned to the application 204-2-3 as the ID.

The server 201-3 has a VMM 202-3.

The VMM 202-3 is software that creates a plurality of virtual machines and controls the OS on the virtual machine. As the VMM 202-3, for example, XEN Server (Svr) version 2.0.2 may be used. VMM3 is assigned to the VMM 202-3 as the ID.

The VMM 202-3 has four virtual machines, and each virtual machine has an OS 203-3.

As the OS 203-3-1, for example, WINDOWS Server (WIN or WIN Svr) version SP2 may be used. VM7 is assigned to the OS 203-3-1 as the ID.

The OS 203-3-1 has an application 204-3-1. The application 204-3-1 is an application that operates on the OS 203-3-1. The application 204-3-1 is application server software, and for example INTERSTAGE version 7.0 may be used. App7 is assigned to the application 204-3-1 is assigned to the application 204-3-1.

As the OS 203-3-2, for example, UBUNTU LINUX (UBUNTU or UB) version 9.10 may be used. VM8 is assigned to the OS203-3-2 as the ID.

The OS 203-3-2 has an application 204-3-1. The application 204-3-2 is an application that operates on the OS 203-3-2. The application 204-3-2 is application server software, and for example Tomcat version 6.0 may be used. App8 is assigned to the application 204-3-2 is assigned to the application 204-3-2.

As the OS 203-3-3, for example, WINDOWS Server (WIN or WIN Svr) version SP2 may be used. VM9 is assigned to the OS 203-3-3 as the ID.

The OS 203-3-3 has an application 204-3-3. The application 204-3-3 is application software that operates on the OS 203-3-3. The application 204-3-3 is database software, and for example, MySQL version 4.0 may be used. App9 is assigned to the application 204-3-3 as the ID.

As the OS 203-3-4, for example, UBUNTU LINUX (UBUNTU or UB) version 9.10 may be used. VM10 is assigned to the OS203-3-4 as the ID.

The OS 203-3-4 has an application 204-3-4. The application 204-3-4 is application software that operates on the OS 203-3-4. The application 204-3-3 is database software, and for example, MySQL version 4.0 may be used. App10 is assigned to the application 204-3-4 as the ID.

The server 201-4 has a VMM 202-4.

The VMM 202-4 is software that creates a plurality of virtual machines and controls the OS on the virtual machine. As the VMM 202-4, for example, XEN Server (Svr) version 2.0.0 may be used. VMM4 is assigned to the VMM 202-4 as the ID.

As the VMM 202-4, for example, Xen Server (Svr) version 2.0.0 may be used. VMM4 is assigned to the VMM 202-4 as the ID.

The top part of FIG. 2 illustrates the service that the user is using.

In the embodiment, the service is provided to three users 301-*j* (j=1-3) by the management target system 103. That is, each use 301-*j* is using applications that are provided by the management target system 103.

The name of the users 303-1 through 301-3 is assumed as User1-3 respectively.

In the description below, the users 301-1 through 301-3 may be indicated as Users1-3.

The User1 is using web servers 401-1-1, 401-1-2, a database 401-1-3.

The web server 401-1-1 is provided by the application 204-1-1.

The web server 401-1-2 is provided by the application 204-2-1.

The database 401-1-3 is provided by the application 204-2-2.

The User2 is using a web server 401-2-1, an application server 401-2-2, a database 401-2-3.

The web server 401-2-1 is provided by the application 204-1-2.

The application server 401-2-2 is provided by the application 204-3-1.

The database 401-2-3 is provided by the application 204-3-3.

The User3 is using web servers 401-3-1, 401-3-2, an application server 401-3-3, a database 401-3-4.

The web server 401-3-1 is provided by the application 204-1-3.

The web server 401-3-2 is provided by the application 204-2-3.

The application server 401-3-3 is provided by the application 204-3-2.

The database 401-3-4 is provided by the application 204-3-4.

Figure 3:
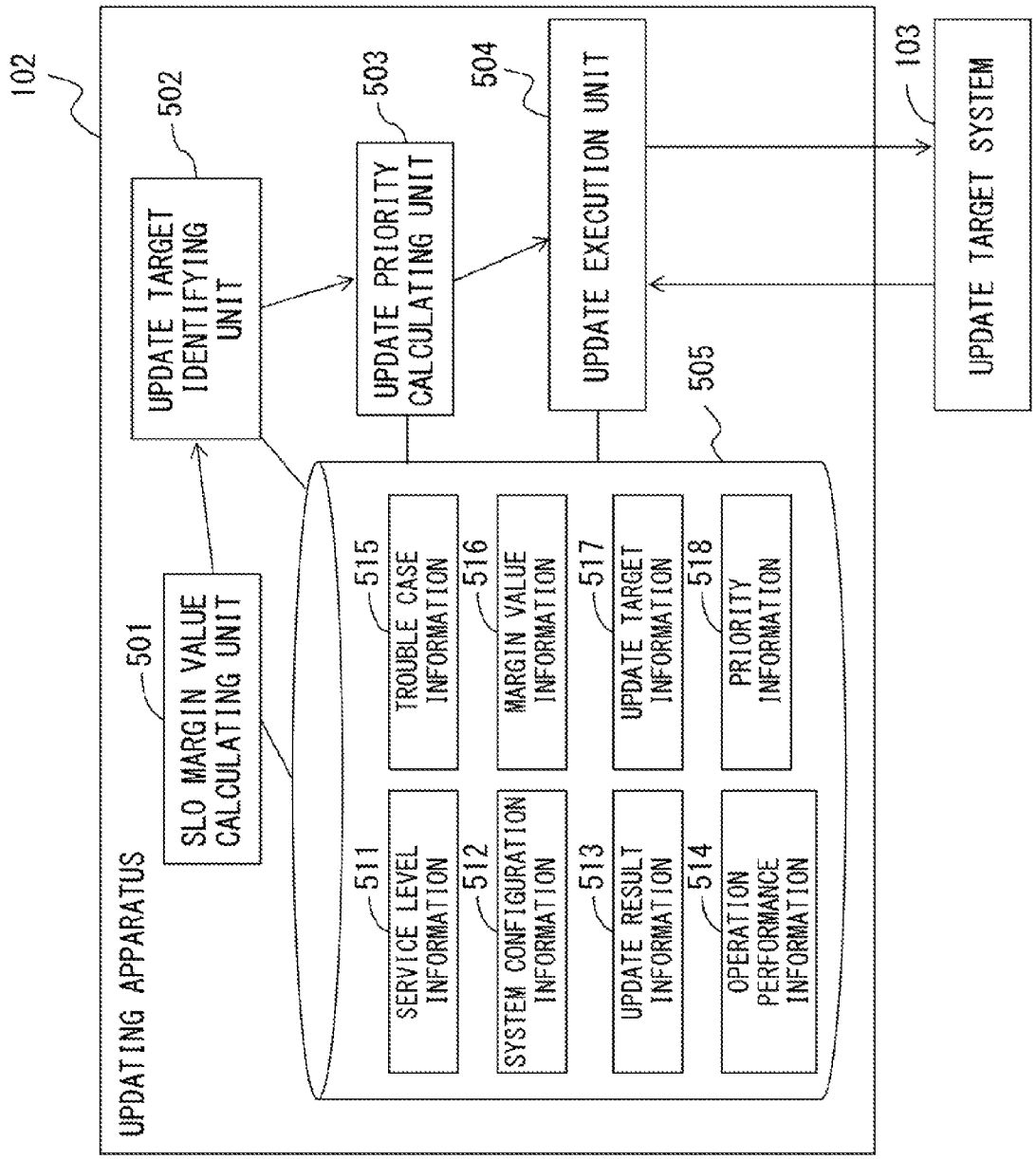
FIG. 3 is a diagram illustrating the configuration of an updating apparatus according to the embodiment.

FIG. 3 is a diagram illustrating an configuration example of an updating apparatus according to the embodiment.

An updating apparatus 102 has an SLO margin value calculating unit 501, an update target identifying unit 502, an update priority calculating unit 503, an update execution unit 504, and a storage unit 505.

The SLO margin value calculation unit 501 calculates the margin value for each user with respect to SLO.

The update target identifying unit 502 identifies a component to be the update target.

The update priority calculating unit 503 calculates the priority of the component being the update target.

The update executing unit 504 executes the update and recovery of the component of the update target system 103 according to the calculated priority. In addition, the update execution 504 obtains information such as configuration information and operation information of the update target system 103, the execution result of the update, and the like.

The storage unit 505 stores various data used at the SLO margin value calculating unit 501, the update target identifying unit 502, the update priority determination unit 503, and the update execution unit 504. The storage unit 505 is, for example, a magnetic disk apparatus, a semiconductor storage apparatus, a Random Access Memory (RAM) and the like.

The storage unit 505 stores service level information 511, system configuration information 512, update request information 513, operation performance information 514, trouble case information 515, margin value information 516, update target information 517, and priority information 518.

Hereinafter, information stored in the storage unit 505 is explained.

FIG. 4 is a diagram illustrating the service level information.

The service level information 511 has the user, SLO, penalty unit price and penalty maximum value as the item.

The user indicates the name of the user to which the service is provided.

The SLO is the service level objective (SLO) to which the contract has been made with the user, and may be regarded as the threshold value for performing control so that the service level does not fall below the value. That is, it indicates the ratio of the operation time per month (operation performance) of the service provided to the user. Furthermore, the maximum value of the down time per month (possible down time/month) for achieving the service level objective is described. Meanwhile, for example, the operation performance may be calculated, assuming one month has 30 days, as (the operating time (minutes) of the service during the month/60*24*30)*100. Meanwhile, the possible down time/month (minutes) of the service may be calculated as (100−SLO)*60*24*30*/100. Meanwhile, the service provided to the user being down means that either of the components that the user is using stops.

The penalty unit price is the penalty paid to the user per hour of the service down time after the operation performance falls below the SLO.

The penalty maximum value is the maximum value of the penalty per month.

In the first line in FIG. 4, the user is User1, the SLO is 99.5% (possible down time/month: 216 minutes), the penalty unit prices is $20/hour, and the penalty maximum value is $500/month. This indicates that the service level objective for User1 is 99.5% (the service down time per month to achieve the service level objective 99.5%, the service down time per month is equal to or less than 216 minutes). That is, it indicates that there is no need to pay the penalty as long as the service down time per month is equal to or less than 216 minutes. In addition, it indicates that when the operation performance of the service provided to User1 falls below the SLO, 20 dollars per hour is paid to User1 according to the service down time, and the maximum penalty per month is 500 dollars.

In the second line in FIG. 4, the user is User2, the SLO is 99.9% (possible down time/month: 43.2 minutes), the penalty unit prices is $ 100/hour, and the penalty maximum value is $1000/month.

In the third line in FIG. 4, the user is User3, the SLO is 99.0% (possible down time/month: 432 minutes), the penalty unit prices is $10/hour, and the penalty maximum value is $200/month.

Figure 5:
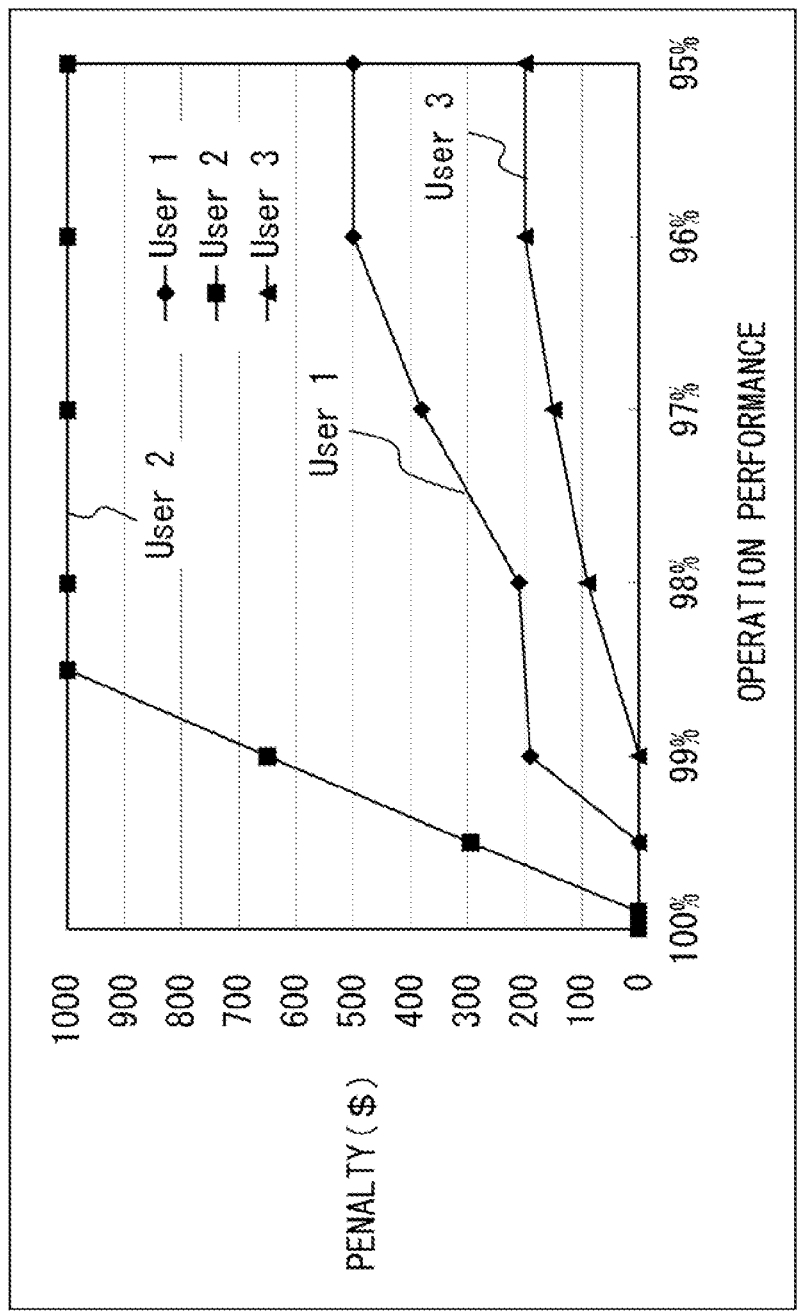
FIG. 5 is a graph illustrating the relationship between the operation performance and penalty based on the service level information.

FIG. 5 is a graph indicating the relationship between the operation performance and the penalty based on the service level information.

The relationship between the operation performance and the penalty based on the service level information in FIG. 4 is presented in a graph as in FIG. 5.

As illustrated in FIG. 5, when the operation performance is equal to or above the SLO, the penalty is 0, and when the operation performance falls below the SLO, the penalty increases gradually to the penalty maximum value as the operation performance decreases.

FIG. 6 is a diagram illustrating the system configuration information.

In the system configuration information 512, information of the hardware components and software components that constitute the update target system. 103 is described while being associated.

The system configuration information 512 illustrated in FIG. 6 is system configuration information corresponding to the management target system 103 illustrated in FIG. 2.

The system configuration information 512 has ID, Name, Type, Version, Dependence, User as the item.

ID represents the identifier (ID) assigned to the component.

Name represents the name of the component.

Type represents the type of the component. For example, PC represents an information processing apparatus (server), VMM represents a Virtual Machine Monitor, OS represents an operating system, Web represents a web server, App represents an application server, and DP represents a database.

Version represents the version of the component.

Dependence represents a component that is being depended on, and the ID of the component being depended is described. That is, it represents a component that is required for itself to operate. For example, referring to FIG. 2, the virtual machine monitor 202-1 (ID:VMM1) is operating on the server 201-1 (ID:PM1). That is, the virtual machine monitor 202-1 (ID:VMM1) is depending on the server 201-1 (ID:PM1). Therefore, in the fifth line of the system configuration information 512 in FIG. 6, PM1 is described in the dependence related to the VMM1.

User represents the user using the component.

FIG. 7 is a diagram illustrating the update request information.

Information related to the update of the component is described in the update request information 513.

The update request information 513 has Name, Type, Applied patch, Required update time, Request recovery time, version, Updated version as the item.

Name represents the name of the component being the update target.

Type represents the type of the component being the update target.

Applied patch/executed command represents the name of the patch to be applied to the component being the update target, or the executed command.

The required update time is the time estimated to be required when the update is executed.

The required recovery time is the time estimated to be required when the update fails and the component is recovered to the original state (that is, the state before the update).

Version represents the version of the component being the update target.

Updated version represents the version of the component after the update completion.

For example, in the first line of the update request information in FIG. 7, Name is XEN Server, Type is VMM, Applied patch/executed command is P-2.02-update.patch, Required update time is 30 minutes, Required recovery time is 10 minutes, Version is 2.0.0 or older, and Updated version is 2.0.2. This indicates that among XEN Servers being the VMM, P-2.02-update.patch is applied to ones whose current version is 2.0.0 or older. Furthermore, it indicates that the time required for update is 30 minutes, that the time required to recover the original state when the update fails is 10 minutes, and that the version of the XEN Server after the update becomes 2.0.2.

In the second line of the update request information in FIG. 7, Name is UBUNTU, Type is OS, Applied patch/executed command is update-notifier-kde-u, Required update time is 40 minutes, Required recovery time is 30 minutes, Version is 9.04 or older, Updated version is 9.10.

In the third line of the update request information in FIG. 7, Name is INTERSTAGE, Type is App, Applied patch/executed command is Upgrade_8.0.exe, Required update time is 15 minutes, Required recovery time is 10 minutes, Version is 7.0 or older, Updated version is 8.0.

Figure 8:
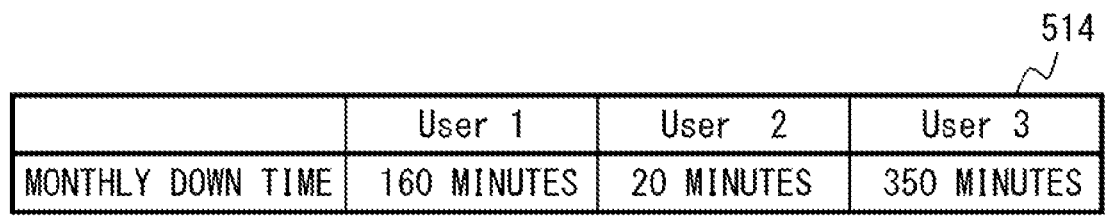
FIG. 8 is a diagram illustrating operation performance information.

FIG. 8 is a diagram illustrating the operation performance information.

In the operation performance information 514, the down time of the service provided to the user during a predetermined time for each user, that is, the down time of the component that the user is using during a predetermined time for each user is described.

In the operation performance information 514, for each user, the monthly down time of the component that the user is using, that is, the time during which the component that the user is using was down for the month is described.

In the operation performance information 514 in FIG. 8, the monthly down time of User1 is 160 minutes, the monthly down time of User2 is 20 minutes, and the monthly down time of User3 is 50 minutes. That is, the operation performance information in FIG. 8 indicates that the component that User1 is using was down for 160 minutes per month. In the same manner, it indicates that the component that User2 is using was down for 20 minutes per month, and that the component that User3 is using was down for 50 minutes per month.

FIG. 9 is a diagram illustrating the trouble case information.

In the trouble case information 515, attribute information of the component for which update failed is described.

The trouble case information 515 has ID, Name, Type, Version, Applied patch/executed command, Dependent component.

ID represents the identifier assigned to the component.

Name represents the name of the component.

Type represents the type of the component.

Version represents the version of the component at the time when update is performed.

Applied patch/executed command represents the name of the patch applied at the time when update is performed, or the executed command executed at the time when update is performed.

Dependent component represents the name and the version of the component that is depended or depending on.

In the trouble case information 515 in FIG. 9, ID is VM3, Name is UBUNTU, Type is OS, Version is 9.04, Applied patch/executed command is update-notifier-kde-u, Dependent component is XEN Svr 2.00 Apache 2.2. This indicates that update failed when update-notifier-kde-u was applied (or executed) for the component whose ID is VM3, Version is 9.04, Name is UBUNTU at the time when update is performed. Furthermore, it indicates that the component that the component for which update failed is depending or the component by which it is being depended on is XEN Svr whose version is 2.0.0 and Apache whose version is 2.2.

FIG. 10 is a diagram illustrating the margin value information.

In the margin value information 516, information related to the margin with respect to the failure to achieve the service level objective for each user (that is, how much margin left before reaching the threshold value of the service level, based on the operation performance) is described.

The margin value information 516 has User, SLO, Possible down time/month, Monthly down time, Margin value, for example, as the item.

The user represents the name of the user.

The SLO is the service level objective (SLO) (threshold value) to which the contract is made with the user.

Possible down time/month is the maximum value of the down time of the service per month to attain the service level objective.

The monthly down time is the down time of the service provided to the user per month, that is, the time during which the component that the user is using was down per month.

Margin value represents the margin before the operating performance of the service falls below the service level objective. That is, the margin value is the difference between the possible down time/month and the monthly down time.

In the first line of the margin value information in FIG. 10, User is User1, SLO is 99.5%, Possible down time/month is 216 minutes, Monthly down time is 160 minutes, Margin value is 56 minutes.

In the second line of the margin value information in FIG. 10, User is User2, SLO is 99.9%, Possible down time/month is 43.2 minutes, Monthly down time is 20 minutes, Margin value is 23.2 minutes.

In the third line of the margin value information in FIG. 10, User is User3, SLO is 99.0%, Possible down time/month is 432 minutes, Monthly down time is 350 minutes, Margin value is 82 minutes.

FIG. 11 is a diagram illustrating the update target information.

In the update target information 517, information identifying the component to be the update target is described.

The update target information 517 has Name, Type, Applied patch/executed command, Version, and Update target ID.

Name represents the name of the component.

Type represents the type of the component.

Applied patch/executed command represents the name of the patch applied at the time when update is performed, or the executed command executed at the time when update is performed.

Version represents the version of the component.

Update target ID represents the ID assigned to the component being the update target.

For example, in the first line of the update target information 517 in FIG. 11, Name is XEN Svr, Type is VMM, Applied patch/executed command is P-2.0.2-update.patch, Version is 2.0.0. or older, Update target ID is VMM1, VMM2, VMM4. This means that the ID of the components being the update target is VMM1, VMM2, VMM4, the name of the components being the update target is XEN Svr, the type of the components being the update target is VMM, the version of the components being the update target is 2.0.0 or older, and a patch applied to the components being the update target or the command to be executed is P-2.0.2-update.patch.

In the second line of the update target information 517 in FIG. 11, Name is UBUNTU, Type is OS, Applied patch/executed command is update-notifier-kde-u, Version is 9.04, Update target ID is VM1, VM3, VM5.

In the third line of the update target information 517 in FIG. 11, Name is INTERSTAGE, Type is App, Applied patch/executed command is Upgrade_8.0.exe, Version is 7.0 or older, Update target ID is App7.

FIG. 12 is a diagram illustrating the priority information.

In the priority information 518-1, information related to the priority of the component being the update target is described.

The priority information 518-1 has Update Target ID, Dependent component ID, User, Margin value, Update&recovery time, Difference, Added penalty, and Order as the item.

Update ID represents the ID assigned to the component being the update target (update target component).

Dependent component ID represents the ID of the component that is dependent on the update target component.

User represents the name of the user using the update target component.

Margin value represents the margin before the operation performance of the service provided to the user falls below the service level objective. When a plurality of users are using the update target component, the minimum value among margin values for the respective users is the margin value.

Update&recovery time is the sum of the required update time being the time estimated to be required when update is performed, and the required recovery time estimated to be required to recover the component to the original state (that is, the state before the update) when the update fails. The update&recovery time is calculated from the required update time and the required recovery time in the update request information 513.

Difference is the difference between the margin value and the update&recovery time. When the difference is positive, the difference represents the margin value after update failure, and indicates that the operation performance will be equal to or above the SLO even if the update fails. When the difference is negative, the absolute value of the difference represents the down time of the component after the operation performance falls below the SLO.

Added penalty is the penalty incurred when the update for the component being the update target fails. The added penalty is calculated based on the difference and the penalty unit price in the service level information 511. When the difference is positive, that is, when the operation performance is equal to or above the SLO, the penalty is not incurred, and the added penalty is 0. When the difference is negative, the added penalty is the penalty corresponding to the absolute value of the difference with respect to the penalty unit price. Meanwhile, the added penalty here is in a dollar term. For example, in the first column of the priority information 518-1 in FIG.

12, the user is User2, and the difference is −1.8 minutes. Referring to the service level information 511, the penalty unit price for User2 is 100 dollars per hour. Therefore, the penalty for 1.8 minutes is 3(=100/60*1.8) dollars.

Order represents the priority for update. Here, it is assumed that a smaller number represents a higher priority. In addition, as the order, other than the number representing the priority, "completed" representing update completion and "trouble" indicating that update is not to be performed as a trouble occurs may be described.

For example, In the first column of the priority information 518-1, Update target ID is App7, Dependent component is—(null), User is User2, Margin value is 23.2 minutes, Update&recovery time is 25 minutes, Difference is −1.8 minutes, Added penalty is 3 dollars, Order is 4. This indicates that the ID of the component being the update target is App7, that there is no component that is dependent on the update target component, and that the user using the update target component is User2. In addition, it indicates that the margin value for User2 is 23.2 minutes, that the penalty paid to User2 when the update fails is 3 dollars as when update is performed and failed for App7, the time required from update to recovery is 25 minutes, and the difference is −1.8 minutes, and that the order of update for App7 is fourth.

Figure 13:
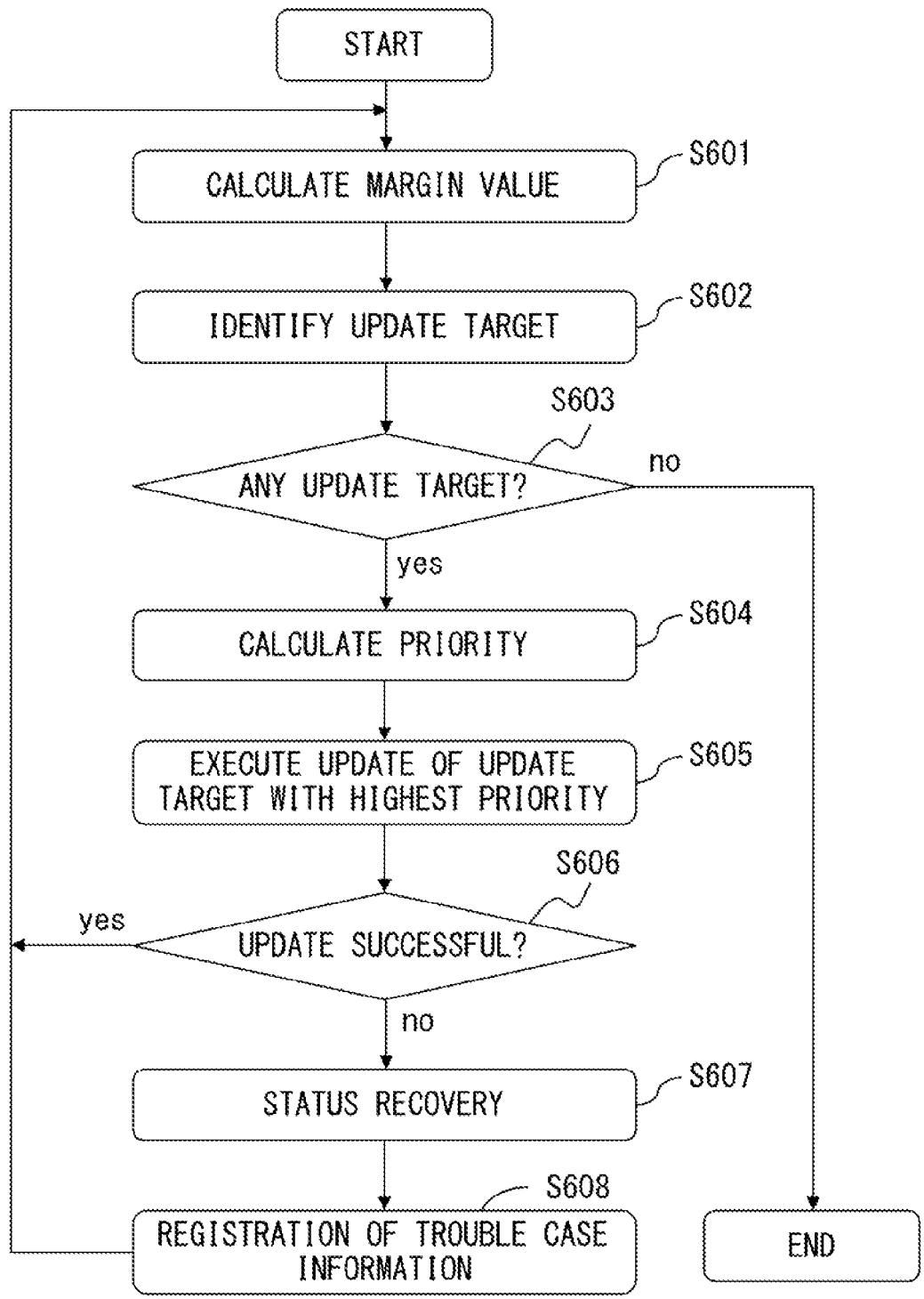
FIG. 13 is a flowchart of a component update process according to the embodiment.

FIG. 13 is a flowchart of the component update process according to the embodiment.

In step S601, the SLO margin value calculating unit 501 calculates the margin value for each user, based on the service level information 511 and the operation performance information 514.

The SLO margin value calculating unit 501 writes information of the calculated margin value and the like into the margin value information 516.

In step S602, the update target identifying unit 502 identifies the component of the management target system 103 to be the update target, based on the system configuration information 512 and the update request information 513. In addition, it writes information of the identified component into the update target information 517.

In Step S603, the update priority calculating unit 503 determines presence/absence of the component to be the update target (update target component). If there is an update target component, the control proceeds to step S604, and if there is no update target component, the process is terminated.

In step S604, the update priority calculating unit 503 calculates the priority of the update target component based on the system configuration information 512, the update request information 513, the margin value information 516, the update target information 517, and the trouble case information 515. In addition, it writes information of the calculated priority and the like into the priority information 518.

The update priority calculating unit 503 gives the highest priority to the component that no user is using, and next, gives higher priority to the components in descending order of the difference between the margin value and the update&recovery time. In addition, if the differences are equal, the update priority calculating unit 503 give higher priority to the component having smaller added penalty. In addition, the priority of the component for which update has been completed is "completed", and the priority of the component having attributes corresponding to the information described in the trouble case information 515 among the update target components is "trouble" indicating that update is not to be performed. In addition, in another embodiment, the priority of a component whose difference is negative may be "hold" indicating that update is not to be performed. In addition, in another embodiment, for example, when the SLO is managed for each month, failure to achieve the SLO may be avoided by performing update after the margin value improves (increases) as the time elapses and the difference of the component whose difference had been negative becomes positive.

In step S605, the update execution unit 504 executes update for the component whose priority is highest among the update target components. The update execution unit 504 does not execute the update to the component whose priority is "trouble" or "hold". As the method of update, if the update target is an OS or application, a snapshot of the update target is obtained, and update is performed. By obtaining the snapshot, recovery to the state before the update may be realized when the update fails. Meanwhile, if the update target is VMM, migration (to evacuate the VM (including the OS and application on the VM) on the VMM being the update target) to another VMM is performed, and update of the VMM is performed.

In step S606, the update execution unit 504 judges whether the update was successful or not. If the update was successful, the control returns to step S601, and if the update failed, the control proceeds to step S607.

In step S607, the update execution unit 504 restores the component for which the update failed to the state before the update.

In step S608, the update execution unit 504 registers the trouble case information 515. As described above, the attribute information of the component for which the update failed is described in the trouble case information 515.

Hereinafter, a case in which the component update process in the embodiment is applied to the management target system 103 in FIG. 2 based on the update request information 513 in FIG. 7 is described.

As the service level information 511, the system configuration information 512, the update request information 513, the operation performance information 514, the ones explained in FIGS. 4, 6-8 are used. In addition, it is supposed that the trouble case information 515, the margin value information 516, the update target information 517, the priority information 518 are in the initial state, that is, no information has been written in.

In addition, in order to make the explanation easier, each component is supposed to be referred to by the ID assigned to the component.

First, the SLO margin value calculating unit 501 reads out the service level information 511 and the operation performance information 514. Then, the SLO margin value calculating unit 501 calculates the difference between the possible down time/month in the service level information 511 and the monthly down time in the operation performance information 514 as the margin value for each user. Meanwhile, if the possible down time/month is not described in the service level information 511, the SLO margin value calculating unit 501 calculates the possible down time/month from the SLO.

The SLO margin value calculating unit 501 writes in the user, SLO, possible down time/month, monthly down time, margin value in to the margin value information 516. Accordingly, the margin value information 516 is made as is described in FIG. 10.

Next, the update target identifying unit 502 reads of the system configuration information 512 and the update request information 513. The update target identifying unit 502 identifies the component that corresponds to the Name, Type, Version in the update request information 513, that is, the update target component, from the system configuration information 512.

When the component whose Name is XEN Svr, Type is VMM, Version is 2.0.0 or older based on the first line of the update request information 513 is identified from the system configuration information 512, VMM1, VMM2, and VMM4 are identified.

When the component whose Name is UBUNTU, Type is OS, Version is 9.04 based on the second line of the update request information 513 is identified from the system configuration information 512, VM1, VM3, and VM5 are identified.

When the component whose Name is INTERSTAGE, Type is App, Version is 7.0 or older based on the third line of the update request information is identified from the system configuration information 512, App7 is identified.

With the ID of the identified component as the update target ID, Name, Type, Applied patch/executed command, Version, and Update target ID are written into the update target information 517. Accordingly, the update target information 517 is made as in FIG. 11.

The update priority calculating unit 503 reads out the system configuration information 512, the update request information 513, the margin value information 516, and the update target information 517. In addition, if there is any trouble case information 515, the update priority calculating unit 503 also reads out the trouble case information 515.

The update target IDs in the update target information 517 are VMM1, VMM2, VMM4, VM1, VM3, VM5, App7. Therefore, the components whose ID is VMM1, VMM2, VMM4, VM3, VM5, App7 are the update target component.

The update priority calculating unit 503 obtains, before calculating the priority, the dependent component ID, user, margin value, update&recovery time, difference, and added penalty of the update target component.

For example, there is no component that is dependent on App7, as it is not found referring to the system configuration information 512 (that is, there is no component where App7 is described for dependency). Therefore, the dependent component ID of App7 is—(null).

The user using App7 is User2 referring to the system configuration information 512. Therefore, the user of App7 is User2.

The margin value of User2 using App7 is 23.2 minutes referring to the margin value information 516. Therefore, the margin value of App7 is 23.2 minutes.

The update request information for App7 is described in the third line of the update request information 513. The sum of the required update time (10 minutes) and the request recovery time (15 minutes) in the third line of the update request information 513 is 25 minutes. Therefore, the update&recovery time of App7 is 25 minutes.

The difference for App7 is −1.8 minutes according to the difference between the margin value (23.2 minutes) and the update&recovery time (25 minutes).

Referring to the service level information 511, the penalty unit price of User2 using App7 is 100 dollars per hour. Therefore, the addedpenalty for App7 is 3 (=100/60*1.8) dollars.

In the same manner, the dependent component ID, user, margin value, update&recovery time, difference and added penalty are obtained for VM1, VM3, VM5, VMM1, VMM2, VMM4 being the update target components.

Then, the update priority calculating unit 503 calculates the order of update for each update target component, that is, the priority.

As described above, for the priority, the highest priority if given to the component that no user is using, and next, high priority is given to the components in descending order of the difference between the margin value and the update&recovery time. Meanwhile, the priority of the component for which update has been completed is set to "completed", and the priority of the component matching the trouble case information 515 is set to "trouble".

Therefore, the order (priority) of VMM4 with no user is highest, and VMM2, VM3, App7, VM1, VM5, VMM1 follow, in descending order of the difference (meanwhile, the order of the VM1 and VM5 is the same).

When the update priority calculating unit 503 writes the update target ID, the update component ID, the user, margin value, update&recovery time, difference, added penalty and calculated order in the priority information 518, the priority information 518-1 is made as illustrated in FIG. 12.

The update execution unit 504 reads out the priority information 518-1.

Referring to the priority information 518-1 in FIG. 12, VMM4 with the highest order is the update target component with the highest priority so the update execution unit 504 performs the update of VMM4.

Here, it is assumed that the update of VMM4 was successful.

The update execution unit 504 updates the system update information 512 so as to match the configuration of the update target system after the update.

FIG. 14 is a diagram illustrating the update position of the system configuration information.

The system configuration information 512-1 in FIG. 14 represents the update position in the system configuration information 512 in FIG. 6. Meanwhile, the number in the brackets (2.0.0) represents the data before update, and the arrow (->) indicates that the data was changed to the data (2.0.2) described to the right of the brackets. Meanwhile, the number and the arrow in the brackets are presented in order to make it easier to understand the update position, is not actually described in the system configuration information 512 after the update. The same applies to the diagram illustrating the update position of other system configuration information.

The update execution unit 504 sets the version of VMM4 of the system configuration information 512 in FIG. 6 to 2.0.2 as illustrated in the system configuration information 512-1 in FIG. 14.

The SLO margin value calculating unit 501 calculates the margin value in the same manner as described above, and writes the user, SLO, possible down time/month, monthly down time, margin value into the margin value information 516.

Then, the update target identifying unit 502 identifies the update target component in the same manner as described above, and writes Name, Type, Applied patch/executed command, Version and Update target ID into the update target information 517.

The update priority calculating unit 503 calculates the priority of the update target component again.

The calculation method of the priority is as described above. In addition, the order of VMM4 for which update has been completed is "completed".

When the update priority calculating unit 503 writes the update target ID, dependent component ID, user, margin value, update&recovery time, difference, added penalty and calculated order into the priority information 518, the priority information 518-2 is made as illustrated in FIG. 15.

The update execution unit 504 reads out the priority information 518-2.

Referring to the priority information 518-2 in FIG. 15, VMM2 with the highest order is the update target component with the highest priority so the update execution unit 504 performs the update of VMM2.

As indicated in the dependent component ID in the priority information 518-2, VM4, VM5 and VM6 are dependent on VMM2. Therefore, the update execution unit 504 performs migration of VM4, VM5 and VM6 before updating VMM2. That is, the update execution unit 504 moves VM4, VM5 and VM6 to another VMM. As the VMM to be the destination of the move, an empty VMM, that is, a VMM that has no OS is desirable. Referring to the system configuration information 512, VMM4 has no OS, so the update execution unit 504 chooses VMM4 as the VMM to be the destination of the move.

The update execution unit 504 moves VM4, VM5 and VM6 to VMM4. Then, the update execution unit 504 performs update of VMM2.

Here, it is assumed that the update of VMM2 was successful.

The update execution unit 504 updates the system update information 512 so as to match the configuration of the update target system 103 after the update.

FIG. 16 is a diagram illustrating the update position in the system configuration information.

The update execution information 504 sets the dependency of VM4, VM5 and VM6 as VMM4, and the version of VMM2 as 2.0.2 in the system configuration information 512, as illustrated in the system configuration information 512-2 in FIG. 16.

The SLO margin value calculating unit 501 calculates the margin value in the same manner as described above, and writes the user, SLO, possible down time/month, monthly down time, margin value into the margin value information 516.

Then, the update target identifying unit 502 identifies the update target component in the same manner as described above, and writes Name, Type, Applied patch/execution command, Version and Update target ID into the update target information 517.

The update priority calculating unit 503 calculates the priority of the update target component again.

The calculation method of the priority is as described above. In addition, the order of VMM2 and VMM4 for which update has been completed is "completed".

When the update priority calculating unit 503 writes the update target ID, dependent component ID, user, margin value, update&recovery time, difference, added penalty and calculated order into the priority information 518, the priority 518-3 is made as illustrated in FIG. 17.

The update execution unit 504 reads out the priority information 518-3.

Referring to the priority information 518-3 in FIG. 17, VMM3 with the highest order is the update target component with the highest priority so the update execution unit 504 performs the update of VMM3.

Here, it is assumed that the update of VM3 failed.

The update execution unit 504 performs the recovery of VM3. In addition, the update execution unit 504 reads out the system configuration information 512 and the update target information 517.

The update execution unit 504 writes the ID, Name, Type, Version, Applied patch/executed command (the patch applied or the command executed at the time when the update was performed), dependent component (Name and Version of a component that the component for which the update failed is depending on or a component that is dependent on the component for which the update failed) into the trouble case information 515.

Referring to the system configuration information 512, the ID of the component for which the update failed is VM3, Name is UBUNTU, Type is OS, Version is 9.04. Meanwhile, referring to the system configuration information 512, the component that VM3 is depending on is VMM1, and Name and Version of VMM1 is XEN Svr and 2.0.0. Meanwhile, the component that is dependent on VM3 is App3, and Name and Version of App3 is Apache and 2.2. Therefore, dependent components are XEN Svr 2.0.0 and Apache 2.2.

In addition, referring to the update target information 517, the applied patch or the executed command to the VM3 at the time of performing the update is update-notifier-kde-u.

These pieces of information, that is, the attribute information of VM3 at the time of the update failure are written into the trouble case information 515 as in FIG. 9.

In addition, the update&recovery time of VM3 is 70 minutes, and VM3 is used by User3. Therefore, the update execution unit 504 adds 70 minutes to the monthly down time for User 3 in the operation performance information 514. Accordingly, the monthly down time for User3 becomes 420 minutes.

The SLO margin value calculating unit 501 calculates the margin value in the same manner as described above, and writes the user, SLO, possible down time/month, monthly down time, margin value into the margin value information 516.

Then, the update target identifying unit 502 identifies the update target component in the same manner as described above, and writes Name, Type, Applied patch/executed command, Version and Update target ID into the update target information 517.

The update priority calculating unit 503 calculates the priority of the update target component again.

The calculation method of the priority is as described above. In addition, the order of VMM2 and VMM4 for which update has been completed is "completed". In addition, the order of the component matching the trouble case information 515, that is, the update target component to which Name, Type, Version, Applied patch/executed command, dependent component correspond is "trouble".

Since the trouble case information 515 has been registered in the last update, the component matching the trouble case information 515 is explained in detail.

Referring to the system configuration information 512, Name of VM1 is to UBUNTU, Type is OS, Version is 9.04. In addition, the component that VM1 is depending on is VMM1, and Name and Version of VMM1 are XEN Svr and 2.0.0. In addition, the component that is dependent on VM1 is App1, and Name and Version of App1 is Apache 2.2. Therefore, dependent components of VM1 are XEN Svr 2.0.0 and Apache 2.2.

In addition, referring to the update target information 517, the applied patch or the executed command to VM1 at the time of performing the update, that is, Applied patch/executed command is update-notifier-kde-u.

Therefore, Name, Type, Version, Applied patch/executed command and Dependent components of VM1 match to Name, Type, Version, Applied patch/executed command and dependent components in the trouble case information 515.

Therefore, update is not to be executed for VM1, and the order of VM1 becomes "trouble". Thus, update for the same combination as the component for which update failed previously is avoided.

In addition, the order of VM3 becomes "trouble" since it matches the trouble case 515.

The update priority calculating unit 503 calculates the priority components other than the component for which update has been completed and the component that matches the trouble case information 515.

When the update priority calculating unit 503 writes the update target ID, dependent component ID, user, margin value, update&recovery time, difference, added penalty, and calculated order into the priority information 518, the priority information 518-4 is made as illustrated in FIG. 18.

The update execution unit 504 reads out the priority information 518-4.

Referring to the priority information 518-4 in FIG. 18, App7 with the highest order is the update target component with the highest priority so the update execution unit 504 performs the update of App7.

Here, it is assumed that the update of App7 was successful.

FIG. 19 is a diagram illustrating the update position of the system configuration information.

The update execution unit 504 sets the version of App7 in the system configuration information 512 in FIG. 6 to 8.0 as illustrated in the system configuration information 512-3 in FIG. 16.

The SLO margin value calculating unit 501 calculates the margin value in the same manner as described above, and writes in the user, SLO, possible down time/month, monthly down time, margin value into the margin value information 516.

Then, the update target specifying unit 502 identifies the update target component in the same manner as described above, and writes Name, Type, Applied patch/executed command, Version and Update target ID into the update target information 517.

The update priority calculating unit 503 calculates the priority of the update target component again.

The calculation method of the priority is as described above. In addition, the order of App7, VMM2 and VMM4 for which update has been completed is "completed". In addition, the order of the component matching the trouble case information 515, that is, VM1 and VM3 is "trouble".

When the update priority calculating unit 503 writes the update target ID, dependent component ID, user, margin value, update&recovery time, difference, added penalty, and calculated order into the priority information 518, the priority information 518-5 is made as illustrated in FIG. 20.

The update execution unit 504 reads out the priority information 518-5.

Referring to the priority information 518-5 in FIG. 20, VM5 with the highest order is the update target component with the highest priority so the update execution unit 504 performs the update of VM5.

Here, it is assumed that the update of VM5 was successful.

FIG. 21 is a diagram illustrating the update position of the system configuration information.

The update execution unit 504 sets the version of VM5 in the system configuration information 512 in FIG. 6 to 9.10 as illustrated in the system configuration information 512-4 in FIG. 21.

The SLO margin value calculating unit 501 calculates the margin value in the same manner as described above, and writes in the user, SLO, possible down time/month, monthly down time, margin value into the margin value information 516.

Then, the update target specifying unit 502 identifies the update target component in the same manner as described above, and writes Name, Type, Applied patch/executed command, Version and Update target ID into the update target information 517.

The update priority calculating unit 503 calculates the priority of the update target component again.

The calculation method of the priority is as described above. In addition, the order of App7, VM5, VMM2 and VMM4 for which update has been completed is "completed". In addition, the order of the component matching the trouble case information 515, that is, VM1 and VM3 is "trouble".

When the update priority calculating unit 503 writes the update target ID, dependent component ID, user, margin value, update&recovery time, difference, added penalty, and calculated order into the priority information 518, the priority information 518-6 is made as illustrated in FIG. 20.

The update execution unit 504 reads out the priority information 518-6.

Referring to the priority information 518-6 in FIG. 22, VMM1 with the highest order is the update target component with the highest priority so the update execution unit 504 performs the update of VMM1.

As indicated in the dependent component ID in the priority information 518-6, VM1, VM2 and VM3 are dependent on VMM1. Therefore, the update execution unit 504 performs migration of VM1, VM2 and VM3 before updating VMM1. That is, the update execution unit 504 moves VM1, VM2 and VM3 to another VMM. Here, the update execution unit 504 chooses VMM2 as the VMM to be the destination of the move.

The update execution unit 504 moves VM1, VM2 and VM3 to VMM2. Then, the update execution unit 504 performs update of VMM1.

Here, it is assumed that the update of VMM1 was successful.

The update execution unit 504 updates the system update information 512 so as to match the configuration of the update target system 103 after the update.

FIG. 23 is a diagram illustrating the update position in the system configuration information.

The update execution information 504 sets the dependency of VM1, VM2 and VM3 as VMM2, and the version of VMM1 as 2.0.2 in the system configuration information 512, as illustrated in the system configuration information 512-5 in FIG. 23.

The SLO margin value calculating unit 501 calculates the margin value in the same manner as described above, and writes the user, SLO, possible down time/month, monthly down time, margin value into the margin value information 516.

Then, the update target identifying unit 502 identifies the update target component in the same manner as described above, and writes Name, Type, Applied patch/execution command, Version and Update target ID into the update target information 517.

The update priority calculating unit 503 calculates the priority of the update target component again.

The calculation method of the priority is as described above. In addition, the order of App7, VM5, VMM1, VMM2 and VMM4 for which update has been completed is "completed". In addition, the order of the component matching the trouble case information 515 is "trouble".

As described in the priority information 518-6 in FIG. 22, in the last calculation of priority, the order of VM1 and VM3 was "trouble", as VM1 and VM3 matched the trouble case information 515. However, in the last updated, VM1 and VM3 moved to VMM2. Since the version of VMM2 is 2.0.2 as described in FIG. 16, VM1 and VM3 no longer match the trouble case information 515, and the order of VM1 and VM3 is no longer "trouble".

When the update priority calculating unit 503 writes the update target ID, dependent component ID, user, margin value, update&recovery time, difference, added penalty and calculated order into the priority information 518, the priority 518-7 is made as illustrated in FIG. 24.

The update execution unit 504 reads out the priority information 518-7.

Referring to the priority information 518-7 in FIG. 24, VM1 with the highest order is the update target component with the highest priority so the update execution unit 504 performs the update of VM1.

Here, it is assumed that the update of VM1 was successful.

The update execution unit 504 updates the system update information 512 so as to match the configuration of the update target system 103 after the update.

FIG. 25 is a diagram illustrating the update position of the system configuration information.

The update execution unit 504 sets the version of VM1 in the system configuration information 512 in FIG. 6 to 9.10 as illustrated in the system configuration information 512-6 in FIG. 25.

The SLO margin value calculating unit 501 calculates the margin value in the same manner as described above, and writes in the user, SLO, possible down time/month, monthly down time, margin value into the margin value information 516.

Then, the update target specifying unit 502 identifies the update target component in the same manner as described above, and writes Name, Type, Applied patch/executed command, Version and Update target ID into the update target information 517.

The update priority calculating unit 503 calculates the priority of the update target component again.

The calculation method of the priority is as described above. In addition, the order of App7, VM1, VM5, VMM1, VMM2 and VMM4 for which update has been completed is "completed". In addition, the order of the component matching the trouble case information 515 is "trouble".

When the update priority calculating unit 503 writes the update target ID, dependent component ID, user, margin value, update&recovery time, difference, added penalty, and calculated order into the priority information 518, the priority information 518-8 is made as illustrated in FIG. 26.

The update execution unit 504 reads out the priority information 518-8.

Referring to the priority information 518-8 in FIG. 26, VM3 with the highest order is the update target component with the highest priority so the update execution unit 504 performs the update of VM3.

Here, it is assumed that the update of VM3 was successful.

The update execution unit 504 updates the system update information 512 so as to match the configuration of the update target system 103 after the update.

FIG. 27 is a diagram illustrating the update position of the system configuration information.

The update execution unit 504 sets the version of VM3 in the system configuration information 512 in FIG. 6 to 9.10 as illustrated in the system configuration information 512-7 in FIG. 27.

The SLO margin value calculating unit 501 calculates the margin value in the same manner as described above, and writes in the user, SLO, possible down time/month, monthly down time, margin value into the margin value information 516.

Then, the update target specifying unit 502 identifies the update target component in the same manner as described above, and writes Name, Type, Applied patch/executed command, Version and Update target ID into the update target information 517.

The update priority calculating unit 503 calculates the priority of the update target component again.

The calculation method of the priority is as described above. In addition, the order of App7, VM1, VM3, VM5, VMM1, VMM2 and VMM4 for which update has been completed is "completed". In addition, the order of the component matching the trouble case information 515 is "trouble".

When the update priority calculating unit 503 writes the update target ID, dependent component ID, user, margin value, update&recovery time, difference, added penalty, and calculated order into the priority information 518, the priority information 518-9 is made as illustrated in FIG. 28.

Since the order in the priority information 518-9 is all "completed", that is there is no component to be the update target, the update process is terminated.

In the update process described above, the target component may be updated without incurring penalty.

If the VM1 is updated earlier than VM3, a penalty of 4.6 dollar is incurred, but the update process of the embodiment may prevent the penalty from being incurred.

Figure 29:
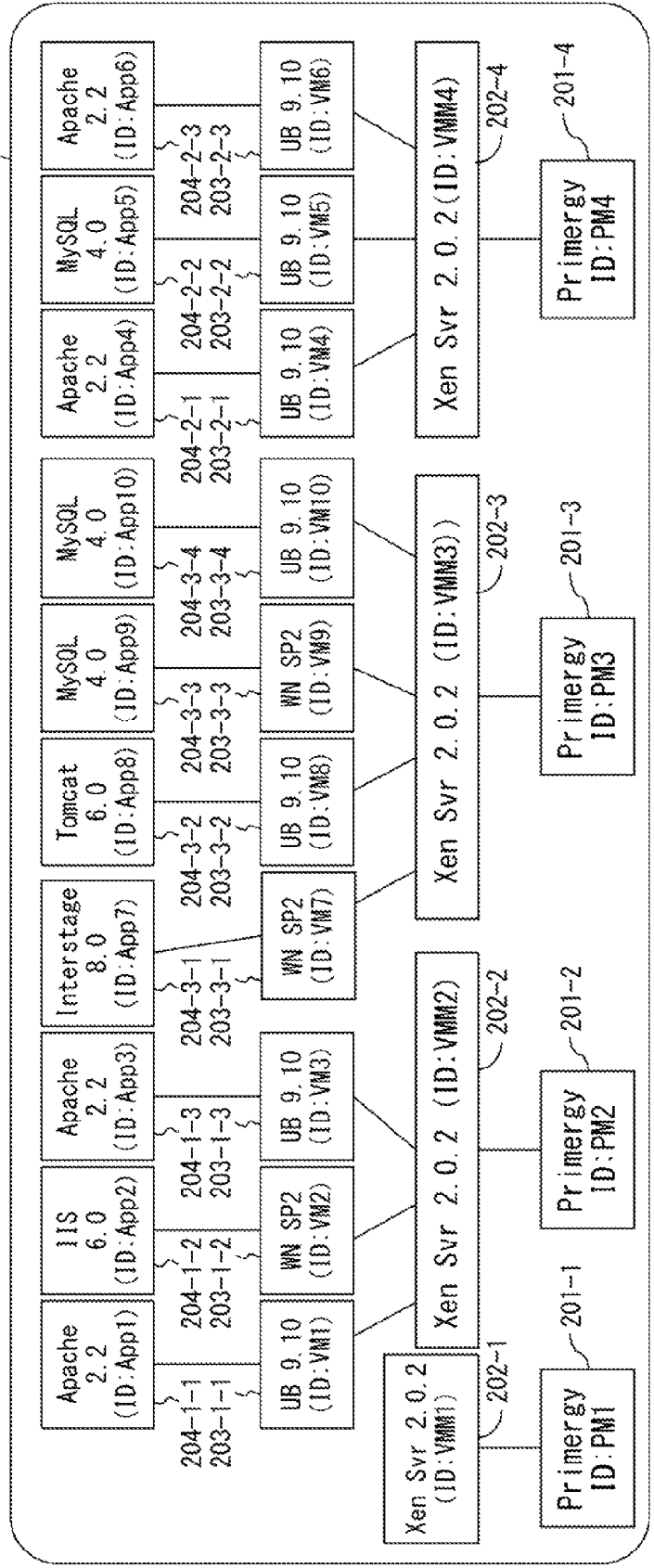
FIG. 29 is a diagram illustrating details of the management target system after updating according to the embodiment.

FIG. 29 is a diagram illustrating details of the management target system after update according to the embodiment.

FIG. 29 illustrates the configuration of the management target system after the update process described above is performed.

The server 201-1 has a VMM 202-1.

The VMM 202-1 is software that creates a plurality of virtual machines and controls the OS on the virtual machine. As the VMM 202-1, for example, XEN Server (Svr) version 2.0.0 may be used. VMM1 is assigned to the VMM 202-1 as the ID.

The server 201-2 has a VMM 202-2.

The VMM 202-2 has three virtual machines, and each virtual machine has an OS 203-1.

As the OS 203-1, for example, UBUNTU LINUX (UBUNTU or UB) version 9.10 may be used. VM1 is assigned to the OS 203-1-1 as the ID.

The OS 203-1-1 has an application 204-1-1. The application 204-1-1 is application software that operates on the OS 203-1-1. The application 204-1-1 is web server software, and for example, Apache version 2.2 may be used. App1 is assigned to the application 204-1-1 as the ID.

As the OS 203-1-2, for example, WINDOWS Server (WIN or WIN Svr) version SP2 may be used. VM2 is assigned to OS 203-1-2 as the ID.

The OS 203-1-2 has an application 204-1-2. The application 204-1-2 is web server software that operates on the OS203-1-2, and for example, IIS version 6.0 may be used. App2 is assigned to the application 204-1-2 as the ID.

As the OS 203-1-3, for example, UBUNTU LINUX (UBUNTU or UB) version 9.10 may be used. VM3 is assigned to the OS 203-1-3 as the ID.

The OS 203-1-3 has an application 204-1-3. The application 204-1-3 is application software that operates on the OS 203-1-1. The application 204-1-3 is web server software, and for example, Apache version 2.2 may be used. App3 is assigned to the application 204-1-3 as the ID.

The server 201-3 has a VMM 202-3.

The VMM202-3 is software that creates a plurality of virtual machines and controls the OS on the virtual machine. As the VMM 202-3, for example, Xen Server (Svr) version 2.0.2 may be used. VMM3 is assigned to the VMM 202-3 as the ID.

The VMM 202-3 has four virtual machines, and each virtual machine has an OS 203-3.

As the OS 203-3-1, for example, WINDOWS Server (WIN or WIN Svr) version SP may be used. VM7 is assigned to the OS 203-3-1 as the ID.

The OS 203-3-1 has an application 204-3-1. The application 204-3-1 is application software that operates on the OS 203-3-1. The application 204-3-1 is application server software, and is an INTERSTAGE for example, and version 8.0 may be used. App7 is assigned to the application 204-3-1 as the ID.

As the OS 203-3-2, for example, UBUNTU LINUX (UBUNTU or UB) version 9.10 may be used. VM8 is assigned to OS 203-3-2 as the ID.

The OS 203-3-2 has an application 204-3-2. The application 204-3-2 is application server software that operations on the OS 203-3-2, and for example, Tomcat version 6.0 may be used. App8 is assigned to the application 204-3-2 as the ID.

As the OS 203-3-3, for example, WINDOWS Server (WIN or WIN Svr) version SP2 may be used. VM9 is assigned to the OS 203-3-3 as the ID.

The OS 203-3-3 has an application 204-3-3. The application 204-3-3 is application software that operates on the OS 203-3-3. The application 204-3-3 is database software, and for example, MySQL version 4.0 may be used. App9 is assigned to the application 204-3-3 as the ID.

As the OS 203-3-4, for example, UBUNTU LINUX (UBUNTU or UB) version 9.10 may be used. VM10 is assigned to the OS 203-3-4 as the ID.

The OS 203-3-4 has an application 204-3-4. The application 204-3-4 is application software that operates on the OS 203-3-4. The application 204-3-3 is database software, and for example, MySQL version 4.0 may be used. App10 is assigned to the application 204-3-4 as the ID.

The server 201-4 has a VMM 202-4.

The VMM202-4 is software that creates a plurality of virtual machines and controls the OS on the virtual machine. As the VMM 202-4, for example, Xen Server (Svr) version 2.0.2 may be used. VMM4 is assigned to the VMM 202-4 as the ID.

The VMM 202-4 has three virtual machines, and each virtual machine has an OS 203-2.

As the OS 203-2-1, for example, UBUNTU LINUX (UBUNTU or UB) version 9.10 may be used. VM4 is assigned to the OS 203-2-1 as the ID.

The OS 203-2-1 has an application 204-2-1. The application 204-2-1 is application software that operates on the OS 203-2-1. The application 204-2-1 is application server software, for example, Apache version 2.2 may be used. App4 is assigned to the application 204-2-1 as the ID.

As the OS 203-2-2, for example, UBUNTU LINUX (UBUNTU or UB) version 9.10 may be used. VM5 is assigned to OS 203-2-2 as the ID.

The OS 203-2-2 has an application 204-2-2. The application 204-2-2 is application server software that operations on the OS 203-2-2, and for example, My SQL version 4.0 may be used. App5 is assigned to the application 204-2-2 as the ID.

As the OS 203-2-3, for example, UBUNTU LINUX (UBUNTU or UB) version 9.10 may be used. VM6 is assigned to the OS 203-2-3 as the ID.

The OS 203-2-3 has an application 204-2-3. The application 204-2-3 is application software that operates on the OS 203-2-1. The application 204-2-3 is web server software, and for example, Apache version 2.2 may be used. App6 is assigned to the application 204-1-3 as the ID.

According to the update apparatus of the embodiment, since components having a large margin in case of failure in update are updated with priority, even if the update fails, failure to achieve the SLO, that is, penalty occurs less. That is, decrease in income of the cloud service provider is avoided.

In addition, according to the update apparatus of the embodiment, since update for the same combination as the a combination of components for which update failed previously is avoided, reducing the possibility that the update fails.

In addition, according to the update method of the embodiment, there is no need to prepare the same testing environment as the update target, making it possible to reduce the cost.

FIG. 30 is a configuration diagram of an information processing apparatus (computer).

The update apparatus 102 and the server 201 of the embodiment are realized by the information processing apparatus 1 as illustrated in FIG. 30 for example.

The information processing apparatus 1 has a Central Processing Unit (CPU) 2, memory 3, input unit 4, output unit 5, storage unit 6, recording medium driving unit 7 and network connection unit 8, which are connected to each other by a bus 9.

The CPU 2 is a central processing apparatus that control the entire information processing apparatus 1. The CPU 2 corresponds to the SLO margin value calculating unit 501, the update target identifying unit 502, the update priority calculating unit 503, the update execution unit 504. In addition, the CPU 2 executes the VMM 202, OS 203, and the application 204.

The memory 3 is a memory such as a Read Only Memory (ROM), a Random Access Memory (RAM) and the like that temporarily stores, when a program is executed, the program or data stored in the storage unit 6 (or a non-transitory portable recording medium 10).

In this case, the program code itself read out from the non-transitory portable recording medium 10 and the like realizes the functions of the embodiment.

The input unit 4 is, for example, a keyboard, mouse, touch panel and the like.

The output unit 5 is, for example, a display, printer and the like.

The storage unit 6 is, for example, a magnetic disk apparatus, an optical disk apparatus, a tape apparatus and the like. The information processing apparatus 1 saves the program and data mentioned above in the storage apparatus 6, k and reads them out on the memory 3 to use as needed.

The memory 3 or the storage unit 6 corresponds to the storage unit 505.

The recording medium driving unit 7 drives the non-transitory portable recording medium 10 and accesses its recorded contents. As the non-transitory portable recording medium, a memory card, a flexible disk, any computer-readable non-transitory recording medium such as a Compact Disk Read Only Memory (CD-ROM), an optical disk, a magneto-optic disk is used.

The user stores the program and data mentioned above in the non-transitory portable recording medium 10, and reads them out on the memory 3 to use as needed.

The network connection unit 8 is connected to any communication network such as LAN, and performs data conversion involved in the communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. An update apparatus used in a system that provides service using software and performing update of the software, the update apparatus comprising:
   a processor configured to calculate a first difference between a possible down time of the service according to a service level and a down time of the service indicated by operation performance stored in a storage unit, and when there are a plurality of pieces of software as update targets, to calculate a plurality of second differences, each of the plurality of second differences comprising a difference between the first difference and a down time of the service when an update of one of the plurality of pieces of software fails, to set an update order of the plurality of pieces of update target software to be a descending order of the second differences, and to perform an update of the plurality of pieces of update target software according to the update order.

2. The update apparatus according to claim 1, wherein the processor checks presence or absence of a user using the plurality of pieces of update target software, and calculates the update order of the plurality of pieces of update target software based on the presence or absence of the user.

3. The update apparatus according to claim 1, wherein when update of the update target software fails, the processor does not perform update of update target software that has same attributes as the update target software for which update failed, among the plurality of pieces of update target software.

4. An update method used in a system that provides service using software and performing update of the software, the method comprising:
   calculating a first difference between a possible down time of the service according to a service level and a down time of the service indicated by operation performance stored in a storage unit;
   calculating, when there are a plurality of pieces of software as update targets, a plurality of second differences, each of the plurality of second differences comprising a difference between the first difference and a down time of the service when update of one of the plurality of pieces of software fails;
   setting an update order of the plurality of pieces of update software to be a descending order of the second differences; and
   performing update of the plurality of pieces of update target software according to the update order.

5. The update method according to claim 4, wherein the calculating the update order of the plurality of pieces of update target software, checks presence or absence of a user using the plurality of pieces of update target software, and calculates the update order of the plurality of pieces of update target software based on the presence or absence of the user.

6. The update method according to claim 4, wherein the updating the plurality of pieces of update target software, when update of the update target software fails, does not perform update of update target software that has same attributes as the update target software for which update failed, among the plurality of pieces of update target software.

7. A computer-readable, non-transitory medium having stored therein a program to make a computer used in a system that provides a service using software execute a process to update the software, the process comprising:
   referring to a storage unit storing a possible down time of the service according to a service level and a down time of the service indicated by operation performance;
   calculating a first difference between the possible down time and the down time;
   calculating, when there are a plurality of pieces of software as update targets, a plurality of second differences each of the plurality of second differences comprising a difference between the first difference and a down time of the service when update of one of the plurality of pieces of software fails;
   setting an update order of the plurality pieces of update target software to be a descending order of the second differences; and
   performing update of the plurality of pieces of update target software according to the update order.

8. The computer-readable, non-transitory medium according to claim 7, wherein the calculating the update order of the plurality of pieces of update target software, checks presence or absence of a user using the plurality of pieces of update target software, and calculates the update order of the plurality of pieces of update target software based on the presence or absence of the user.

9. The computer-readable, non-transitory medium according to claim 7, wherein the updating the plurality of pieces of update target software, when update of the update target software fails, does not perform update of update target software that has same attributes as the update target software for which update failed, among the plurality of pieces of update target software.

* * * * *